United States Patent
Hiasa

(10) Patent No.: US 9,894,252 B2
(45) Date of Patent: Feb. 13, 2018

(54) IMAGE PROCESSING APPARATUS, IMAGE PICKUP APPARATUS, IMAGE PROCESSING METHOD, AND STORAGE MEDIUM FOR REDUCING NOISE OF AN IMAGE OBTAINED BY COMBINING PARALLAX IMAGES

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 263 days.

(21) Appl. No.: 14/024,746

(22) Filed: Sep. 12, 2013

(65) Prior Publication Data

US 2014/0071313 A1   Mar. 13, 2014

(30) Foreign Application Priority Data

Sep. 12, 2012   (JP) .................................. 2012-200117

(51) Int. Cl.
  *H04N 5/21*   (2006.01)
  *G06T 5/50*   (2006.01)
  (Continued)

(52) U.S. Cl.
  CPC ................. *H04N 5/21* (2013.01); *G06T 5/50* (2013.01); *H04N 5/217* (2013.01);
  (Continued)

(58) Field of Classification Search
  CPC ............................................ G06T 2207/10052
  See application file for complete search history.

(56) References Cited

U.S. PATENT DOCUMENTS 7,133,069 B2   11/2006   Wallach et al.
7,657,122 B2    2/2010   Tanida et al.
(Continued)

FOREIGN PATENT DOCUMENTS

CN   1611064 A    4/2005
JP   06-086332 A    3/1994
JP   2005167484 A    6/2005

OTHER PUBLICATIONS

Georgiev, et al., "Superresolution with Plenoptic 2.0 Cameras", 2009 Optical Society of America.
(Continued)

*Primary Examiner* — Twyler Haskins
*Assistant Examiner* — Akshay Trehan
(74) *Attorney, Agent, or Firm* — Rossi, Kimms & McDowell LLP

(57) ABSTRACT

An image processing apparatus capable of generating a plurality of output images having different focus positions by reconstructing an input image, includes a storage unit storing image pickup condition information, and an image processing unit generating the output image from the input image using the image pickup condition information, and the image processing unit obtains the input image that is information of an object space viewed from a plurality of viewpoints that is obtained via an imaging optical system and an image pickup element having a plurality of pixels, calculates an average pixel value of a pixel group of the input image of the same region, and substitutes each pixel value of the pixel group by the average pixel value, and performs combination such that the pixels substituted by the average pixel value are shifted from each other to generate the output image.

10 Claims, 17 Drawing Sheets

(51) Int. Cl.
*H04N 5/232* (2006.01)
*H04N 5/217* (2011.01)
(52) U.S. Cl.
CPC ..... *H04N 5/23232* (2013.01); *G06T 2200/21* (2013.01); *G06T 2207/10052* (2013.01); *G06T 2207/20216* (2013.01); *G06T 2207/20221* (2013.01)

(56) References Cited

U.S. PATENT DOCUMENTS

| | | | | |
|---|---|---|---|---|
| 8,315,476 | B1* | 11/2012 | Georgiev et al. | 382/276 |
| 8,325,241 | B2* | 12/2012 | Yoshioka | H04N 5/2254 |
| | | | | 348/207.99 |
| 2003/0071905 | A1* | 4/2003 | Yamasaki | 348/239 |
| 2007/0160310 | A1 | 7/2007 | Tanida et al. | |
| 2007/0252074 | A1* | 11/2007 | Ng | G02B 3/0056 |
| | | | | 250/208.1 |
| 2008/0131019 | A1* | 6/2008 | Ng | G06T 5/001 |
| | | | | 382/255 |
| 2009/0140131 | A1* | 6/2009 | Utagawa | G02B 3/0056 |
| | | | | 250/226 |
| 2009/0160997 | A1* | 6/2009 | Oyama | H04N 5/2254 |
| | | | | 348/340 |
| 2010/0103175 | A1* | 4/2010 | Okutomi et al. | 345/428 |
| 2011/0129054 | A1* | 6/2011 | De Villiers | G06T 3/4053 |
| | | | | 378/2 |
| 2011/0199458 | A1* | 8/2011 | Hayasaka | G06T 7/0075 |
| | | | | 348/43 |
| 2011/0228131 | A1* | 9/2011 | Iwane | G06T 7/0018 |
| | | | | 348/231.99 |
| 2011/0316968 | A1* | 12/2011 | Taguchi | H04N 5/23238 |
| | | | | 348/36 |
| 2013/0064453 | A1* | 3/2013 | Nagasaka | H04N 5/225 |
| | | | | 382/190 |

OTHER PUBLICATIONS

Ng, et al., "Light Field Photography with a Hand-held Plenoptic Camera", 2005 Computer Science Technical Report CTSR.

Ng, et al., "Fourier Slice Photography" (2005 ACM Trans. Graph. 24, 735-744).

Office Action issued in Chinese Patent Application No. 201310415360.3, dated Nov. 7, 2016. English translation provided.

* cited by examiner

IMAGE PROCESSING APPARATUS, IMAGE PICKUP APPARATUS, IMAGE PROCESSING METHOD, AND STORAGE MEDIUM FOR REDUCING NOISE OF AN IMAGE OBTAINED BY COMBINING PARALLAX IMAGES

BACKGROUND OF THE INVENTION

Field of the Invention

The present invention relates to an image processing apparatus which reconstructs an input image to generate a plurality of output images with different focus positions.

Description of the Related Art

Recently, an image pickup apparatus is provided which outputs various images by performing calculation on data obtained by an image pickup element and performing a digital image process corresponding thereto. Ren Ng, et al., "Light Field Photography with A Hand-held Plenoptic CAMERA", 2005 COMPUTER Science Technical Report CTSR, and Todor Georgiev, et al., "Superresolution with Plenoptic 2.0 CAMERA", 2009 Optical Society OF America disclose an image pickup apparatus which simultaneously obtains two-dimensional intensity distribution of light in an object space and angle information of a light beam, that is, parallax information, using "Light Field Photography". The two-dimensional intensity distribution of light and the angle information of a light beam are collectively called light field, and it is possible to obtain three-dimensional information of the object space by obtaining the light field. By performing a reconstruction process of an image using the obtained light field, it is possible to perform refocusing such as changing a focus position of an image, changing an imaging viewpoint, and adjusting a depth of field.

Meanwhile, the image pickup apparatus is required to have further high image quality according to advance of a display device. For high image quality, it is important to reduce noise of an image. Japanese Patent Laid-open No. H06-86332 discloses a method of reducing noise by combining images obtained through a plurality of image pickup optical systems.

However, in the noise reducing method disclosed in Japanese Patent Laid-Open No. H06-86332, pixels that image the same object are simply combined. In this case, when the noise follows Poisson distribution, N pixels are combined such that the noise is reduced by $N^{-1/2}$ times by averaging. However, according to the advance of the display device, the image is required to have further high quality, and thus the noise reducing method disclosed in Japanese Patent Laid-Open No. H06-86332 is insufficient.

BRIEF SUMMARY OF THE INVENTION

The present invention provides an image processing apparatus, an image pickup apparatus, an image processing method, and an image processing program that effectively reduce noise of an image obtained by combining parallax images.

An image processing apparatus as one aspect of the present invention is capable of generating a plurality of output images having different focus positions by reconstructing an input image, includes a storage unit configured to store image pickup condition information of the input image, and an image processing unit configured to generate the output image from the input image using the image pickup condition information, and the image processing unit is configured to obtain the input image that is information of an object space viewed from a plurality of viewpoints that is obtained via an imaging optical system and an image pickup element having a plurality of pixels, calculate an average pixel value of a pixel group of the input image of the same region of the object space, and substitute each pixel value of the pixel group by the average pixel value, and perform combination such that the pixels of the pixel group substituted by the average pixel value are shifted from each other to generate the output image.

An image pickup apparatus as another aspect of the present invention is capable of generating a plurality of output images having different focus positions by reconstructing an input image, includes an imaging optical system, an image pickup element including a plurality of pixels, a lens array configured to cause a light beam from the same position of an object plane to enter pixels of the image pickup element different from each other in accordance with a pupil region of the imaging optical system through which the light beam passes, and an image processing unit configured to generate the output image from the input image obtained by the image pickup element, and the image processing unit is configured to obtain the input image that is information of an object space viewed from a plurality of viewpoints that is obtained via the imaging optical system, the image pickup element, and the lens array, calculate an average pixel value of a pixel group of the input image of the same region of the object space, and substitute each pixel value of the pixel group by the average pixel value, and perform combination such that the pixels of the pixel group substituted by the average pixel value are shifted from each other to generate the output image.

An image pickup apparatus as another aspect of the present invention is capable of generating a plurality of output images having different focus positions by reconstructing an input image, includes an imaging optical system including a plurality of optical systems having a positive refractive power, at least one image pickup element including a plurality of pixels, and an image processing unit configured to generate the output image from the input image obtained by the image pickup element, when a pupil of the imaging optical system is a pupil formed by combining pupils of the plurality of optical systems, the plurality of optical systems are arranged such that a light beam from the same position of an object plane enters pixels of the image pickup element different from each other in accordance with the a pupil region of the imaging optical system through which the light beam passes, and the image processing unit is configured to obtain the input image that is information of an object space viewed from a plurality of viewpoints that is obtained via the imaging optical system and the image pickup element, calculate an average pixel value of a pixel group of the input image of the same region of the object space, and substitute each pixel value of the pixel group by the average pixel value, and perform combination such that the pixels of the pixel group substituted by the average pixel value are shifted from each other to generate the output image.

An image processing method as another aspect of the present invention is capable of generating a plurality of output images having different focus positions by reconstructing an input image, the method includes the steps of obtaining the input image that is information of an object space viewed from a plurality of viewpoints that is obtained via an imaging optical system and an image pickup element having a plurality of pixels, calculating an average pixel value of a pixel group of the input image of the same region of the object space, and substituting each pixel value of the pixel group by the average pixel value, and performing combination such that the pixels of the pixel group substituted by the average pixel value are shifted from each other to generate the output image.

A non-transitory computer-readable storage medium as another aspect of the present invention stores an image processing program capable of generating a plurality of output images having different focus positions by reconstructing an input image, the image processing program being configured to cause an information processing apparatus to execute the steps of obtaining the input image that is information of an object space viewed from a plurality of viewpoints that is obtained via an imaging optical system and an image pickup element having a plurality of pixels, calculating an average pixel value of a pixel group of the input image of the same region of the object space, and substituting each pixel value of the pixel group by the average pixel value, and performing combination such that the pixels of the pixel group substituted by the average pixel value are shifted from each other to generate the output image.

Further features and aspects of the present invention will become apparent from the following description of exemplary embodiments with reference to the attached drawings.

DETAILED DESCRIPTION OF THE PREFERRED EMBODIMENTS

Figure 1:
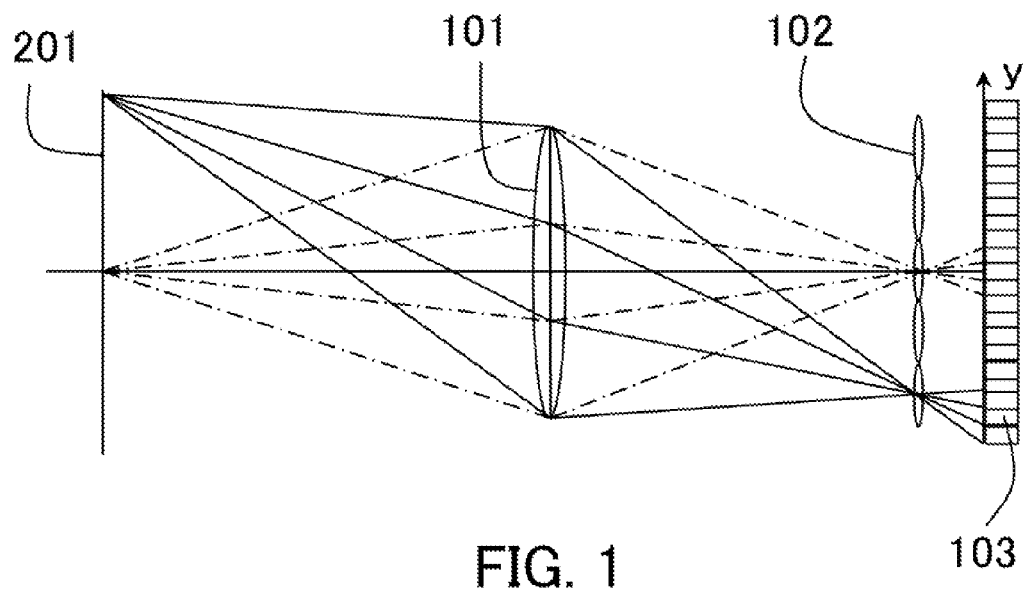
FIG. 1 is a schematic configuration diagram of an image pickup optical system in Embodiment 1.

Exemplary embodiments of the present invention will be described below with reference to the accompanied drawings. In each of the drawings, the same elements will be denoted by the same reference numerals and a duplicate description will be omitted.

An image processing method of the embodiment is capable of generating a plurality of output images having different focus positions by reconstructing an input image. The input image is an image (a parallax image) imaging an object space from different viewpoints to obtain a light field, and is obtained by the following image pickup apparatus. That is, the image pickup apparatus is configured to obtain the light field by arranging a plurality of optical systems having a positive refractive power or by disposing a lens array on an image side of an imaging optical system.

FIGS. 1 to 4 are examples of an image pickup optical system constituting such an image pickup apparatus. The image pickup optical system is configured to include an imaging optical system and an image pickup element. When a lens array is provided, the image pickup optical system is configured to include the lens array. In addition, as a method of obtaining another light field, a method of performing imaging many times while changing a position of an image pickup apparatus using the image pickup apparatus of obtaining two-dimensional intensity distribution of light of an object space is conceivable. In this case, the light field (the parallax image) is obtained by imaging an object space at times different from each other. For this reason, when a moving object is present in the object space, it is difficult to obtain correct information (parallax information). Accordingly, as illustrated in FIGS. 1 to 4, it is preferable that the image pickup optical system have a configuration capable of simultaneously obtaining parallax images (a plurality of parallax images).

A person or an object may not be necessarily present on an object plane 201 illustrated in FIGS. 1 to 4. This is because it is possible to focus on a person and an object present behind or in front of the object plane 201 after the imaging by a reconstruction process. In addition, for convenience, description of the following embodiments is performed using a one-dimensional system, but the same discussion is achieved about a two-dimensional system.

Embodiment 1

Figure 5:
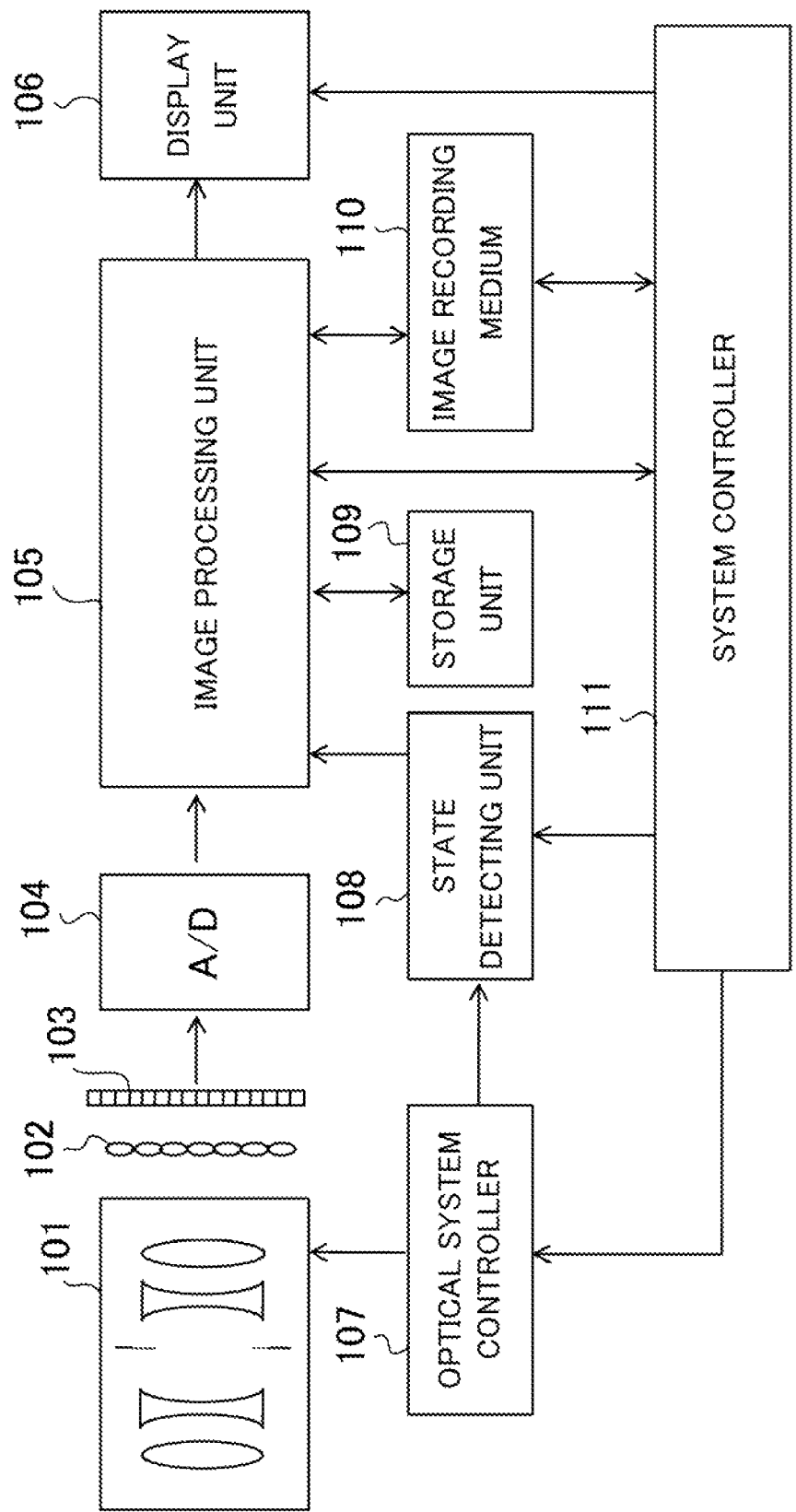
FIG. 5 is a block diagram of an image pickup apparatus in Embodiment 1.

First, a configuration of an image pickup apparatus in Embodiment 1 of the invention will be described with reference to FIG. 5. FIG. 5 is a block diagram of the image pickup apparatus of the embodiment. An image processing method of the embodiment is performed by an image processing unit 105 of the image pickup apparatus.

An image pickup element 103 is a two-dimensional image pickup element such as CCD (Charge Coupled DEVICE) or CMOS (Complementary Metal-Oxide Semiconductor), and is provided with a plurality of pixels. Energy of a light beam entering the image pickup element 103 via an imaging optical system 101 (a main lens unit) and a lens array 102 becomes an electric signal (an analog signal), and is converted into a digital signal by an A/D converter 104. The digital signal is subjected to a predetermined process in the image processing unit 105, and is stored in an image recording medium 110 such as a semiconductor memory in a predetermined format. In this case, image pickup condition information of the image pickup apparatus obtained from a state detecting unit 108 is also stored. The image pickup condition information is an imaging distance, an aperture, a focal length in a zoom lens, and the like. The state detecting unit 108 may directly obtain the image pickup condition information from a system controller 111, and may obtain information about the image pickup optical system from an optical system controller 107.

When the image stored in the image recording medium 110 is displayed on a display unit 106, a reconstruction process is performed based on the image pickup condition information by the image processing unit 105. As a result, an image reconstructed at a desired viewpoint, at a focus position, and in a depth of field is displayed on the display unit 106. In addition, for a high speed, desired image settings (a viewpoint, a focus, and a depth of field) may be stored in a storage unit 109 in advance, and a reconstructed image may be directly displayed on the display unit 106 without the image recording medium 110. In addition, the image recorded in the image recording medium 110 may be an image after reconstruction. A series of controls described above is performed by the system controller 111, and mechanical driving of the image pickup optical system is performed by the optical system controller 107 by an instruction of the system controller 111.

Figure 6:
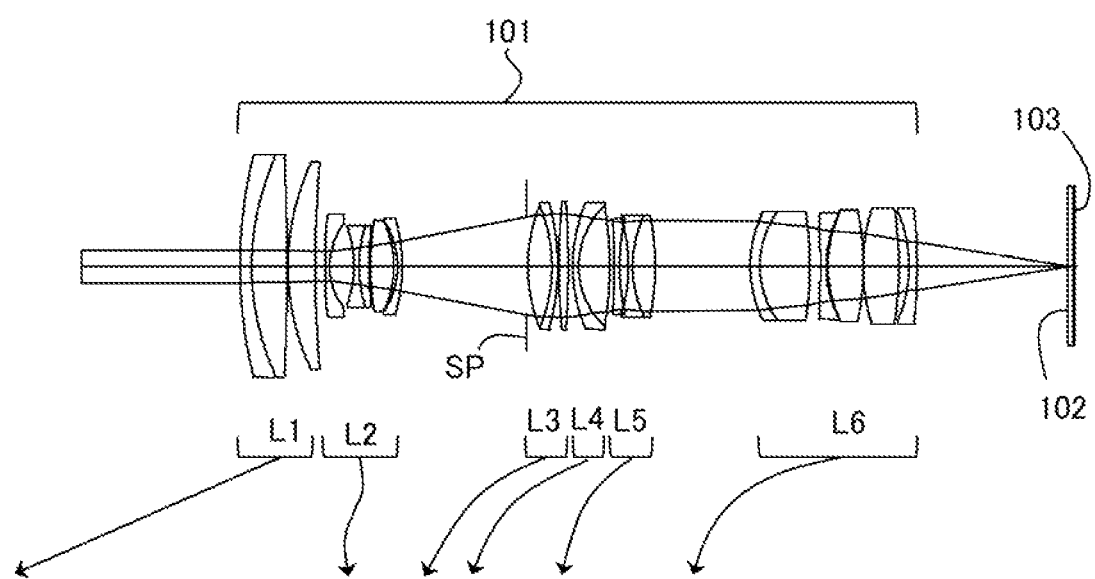
FIG. 6 is a cross-sectional view of an image pickup optical system in Embodiment 1.

Next, a configuration of the image pickup optical system in the embodiment will be described with reference to FIGS. 1 and 6. FIG. 1 is a schematic configuration diagram of the image pickup optical system. FIG. 6 is a cross-sectional view of the image pickup optical system. The image pickup optical system is configured to include the imaging optical system 101, the lens array 102, and the image pickup element 103. In the embodiment, the lens array 102 is configured using a plurality of lenses (small lenses), and the small lenses are configured by solid lenses. However, the embodiment is not limited thereto, and the lens array 102 may be configured using a liquid lens, a liquid crystal lens, or a diffraction optical element. Surfaces of both sides of the small lenses constituting the lens array 102 have a convex shape. However, the embodiment is not limited thereto, and a surface of one side may be a flat surface and a surface of the other side may have a convex shape.

The lens array 102 is disposed on an image-side conjugate plane with respect to the object plane 201 of the imaging optical system 101. In addition, the lens array 102 is configured such that an exit pupil of the imaging optical system 101 and the image pickup element 103 are substantially in a conjugate relation. A light beam from the same position on the object plane 201 passes through the imaging optical system 101 and the lens array 102, and then enters pixels of the image pickup element 103 different from each other according to a position and an angle of the light beam on the object plane 201, to obtain a light field. Here, the lens array 102 serves to prevent the light beam passing through different positions on the object plane 201 from entering the same pixel. As a result, in the image pickup element 103, an image in which the pixel groups obtained by imaging the same region on the object plane 201 from a plurality of viewpoints are arranged is obtained. In the configuration illustrated in FIG. 1, the same position on the object plane 201 is imaged by three pixels (nine pixels on two dimensions). For this reason, in the image pickup optical system of the embodiment, two-dimensional space resolution is reduced by ⅑ in the image pickup optical system which obtains only two-dimensional intensity distribution of light. This is qualitatively the same even when the number of pixels imaging the same position on the object plane 201 is changed.

In addition, it is preferable that a surface of an image side (the image pickup element 103 side) of the small lenses constituting the lens array 102 have a convex shape. Accordingly, astigmatism of the lens array 102 is reduced, and an image obtained on the image pickup element 103 becomes sharp. On the contrary, when the surface of the image side is not the convex shape, the astigmatism is increased, and a peripheral portion of an image formed by each small lens is blurred. When the image-blurred portion is used in the reconstruction process, it is difficult to obtain a sharp reconstructed image. In addition, it is further preferable that a surface of an object side (the imaging optical system 101 side) of the small lens have a flat or convex shape. Accordingly, a curvature of the small lens becomes low, aberration is reduced, and it is possible to further improve sharpness of the image.

Figure 7A:
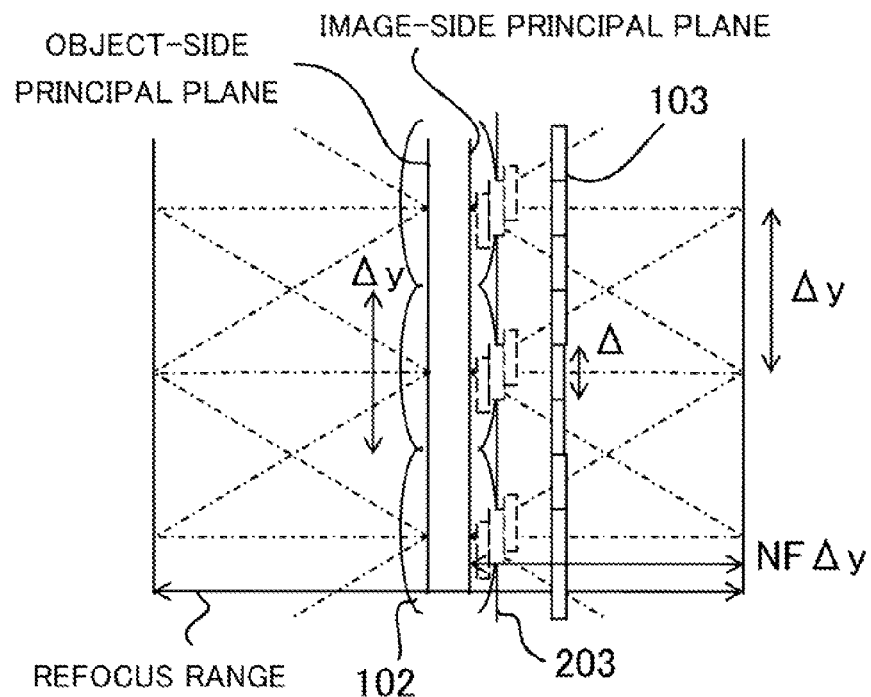
FIGS. 7A and 7B are diagrams illustrating refocus image generation in Embodiment 1.
Figure 7B:
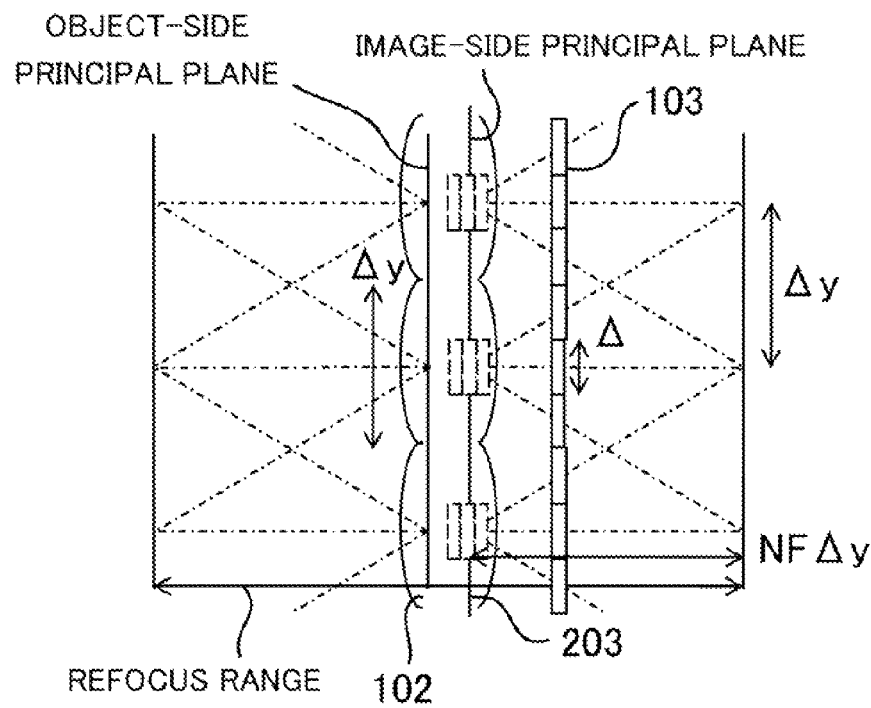

Subsequently, refocus processing in the embodiment will be described. The refocus processing is described in "Fourier Slice Photography" (Ren Ng, 2005 ACM Trans. Graph. 24, 735-744), and thus will be briefly described herein. An example of a method of generating a refocus image will be described with reference to FIG. 7. FIGS. 7A and 7B are diagrams specifically illustrating a part of the lens array 102 and the image pickup element 103 in the image pickup optical system illustrated in FIG. 1. A chain line in FIGS. 7A and 7B is obtained by extending a center of each pixel and a path of a light beam passing through an image-side principal point of the small lens corresponding to the pixel. A virtual imaging plane 203 is an image-side conjugate plane of the imaging optical system 101 with respect to the object-side plane to be focused by refocus. However, in the embodiment, when the image-side conjugate plane is positioned closer to the image side than an object-side principal plane of the lens array 102, a plane obtained by moving the image-side conjugate plane to the image side by a principal plane distance of the lens array 102 is the virtual imaging plane 203. A pixel value obtained by the image pickup element 103 is moved in parallel to the virtual imaging plane 203 along a chain line and is combined, and thus it is possible to generate a refocus image at a desired focus position.

For example, in order to generate an image focused on the object plane 201 of FIG. 1, as illustrated in FIG. 7B, the virtual imaging plane 203 may be set on a conjugate plane, that is, the principal plane (the image-side principal plane) of the lens array 102 through the object plane 201 and the imaging optical system 101. In FIGS. 7A and 7B, the pixel moved in parallel at the time of generating the refocus image is represented by a broken line, and is illustrated by sliding without overlapping to be easily seen. As illustrated in FIGS. 7A and 7B, at the time of generating an arbitrary refocus image, when the pupil region of the imaging optical system 101 through which light flux entering the pixel passes is the same, it is understood that such a pixel has the same parallel movement amount. Accordingly, an operation of the pixel at the time of generating the refocus image is determined depending on the pupil region of the imaging optical system 101 through which the light flux entering the pixel passes.

Next, a refocusable range will be described. Since an opening size of the imaging optical system 101 is finite, an angle component of the light field obtained by the image pickup element 103, that is, parallax information is also finite. Accordingly, the refocusable range is limited to a finite range. Here, two-dimensional intensity distribution of light is called a space component of the light field. In this case, the refocus range is determined by a sampling pitch $\Delta y$ of the space component and a sampling pitch $\Delta u$ of the angle component, and a coefficient $\alpha_\pm$ thereof is given as the following Expression (1).

$$\alpha_\pm = \frac{1}{1 \pm \Delta y / \Delta u} \quad (1)$$

The refocus range $\alpha_+ s_2$ to $\alpha_- s_2$ of the image side represented by Expression (1) and the range conjugate with respect to the imaging optical system 101 are the refocus range of the object side. Here, $s_2$ is a distance between the image-side principal plane of the imaging optical system 101 and the image-side conjugate plane of the imaging optical system 101 with respect to the object plane 201.

Figure 8:
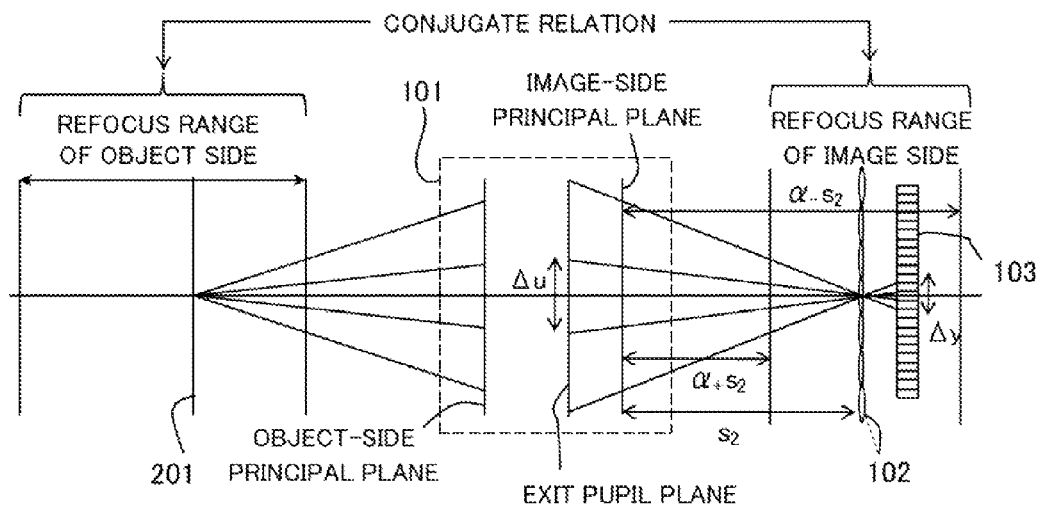
FIG. 8 is a diagram illustrating refocus range in Embodiment 1.

FIG. 8 is a diagram of a refocus range. In a configuration example illustrated in FIG. 8, a one-dimensional cycle of the lens array 102 is three pixels, and thus the sampling pitch $\Delta y$ of the space component is three times the pixel pitch $\Delta u$ of the image pickup element 103. The sampling pitch of the angle component is ⅓ of an exit pupil diameter since the exit pupil of the imaging optical system 101 is divided into three (divided into nine on two dimensions). When it is over the refocus range represented by Expression (1), information is insufficient in the obtained light field, and it is difficult to generate a correct refocus image. Expression (1) may be approximated as the following Expression (2) since a pixel pitch $\Delta$ of the image pickup element 103 is sufficiently smaller than an exit pupil distance P of the imaging optical system 101.

$$\alpha_\pm s_2 = s_2 \mp NF\Delta y = s_2 \mp NF\Delta_{LA} \quad (2)$$

Here, the exit pupil distance P of the imaging optical system 101 is a distance between the exit pupil plane of the imaging optical system 101 and the image-side conjugate plane of the imaging optical system 101 with respect to the object plane 201. In addition, N is the number of one-dimensional divisions of the pupil of the imaging optical system 101, and F is an F number of the imaging optical system 101, and $\Delta_{LA}$ is a pitch of the lens array 102. When the pixel group corresponding to any small lens is moved in parallel along a chain line of FIG. 7, it is over the maximum refocus amount of Expression (2), the distance of the pixels becomes larger than $\Delta y$, and a region with lacked information occurs. In this case, it is difficult to generate the correct refocus image.

Figure 9:
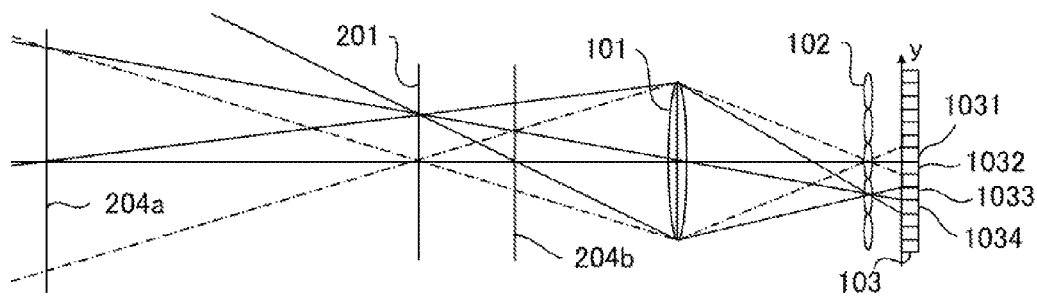
FIG. 9 is a diagram illustrating a relation of an image pickup optical system and an object distance in Embodiment 1.

Next, a noise reducing process (an image processing method) in the embodiment will be described. First, a noise reducing effect according to the conventional reconstruction method will be described. For easily understanding, the number of one-dimensional pupil divisions of the imaging optical system 101 is two in the configuration of FIG. 1, and a case of a configuration illustrated in FIG. 9 is considered. FIG. 9 is a relational diagram between the image pickup optical system and the object distance in the embodiment. However, the following discussion is not limited thereto.

Figure 10:
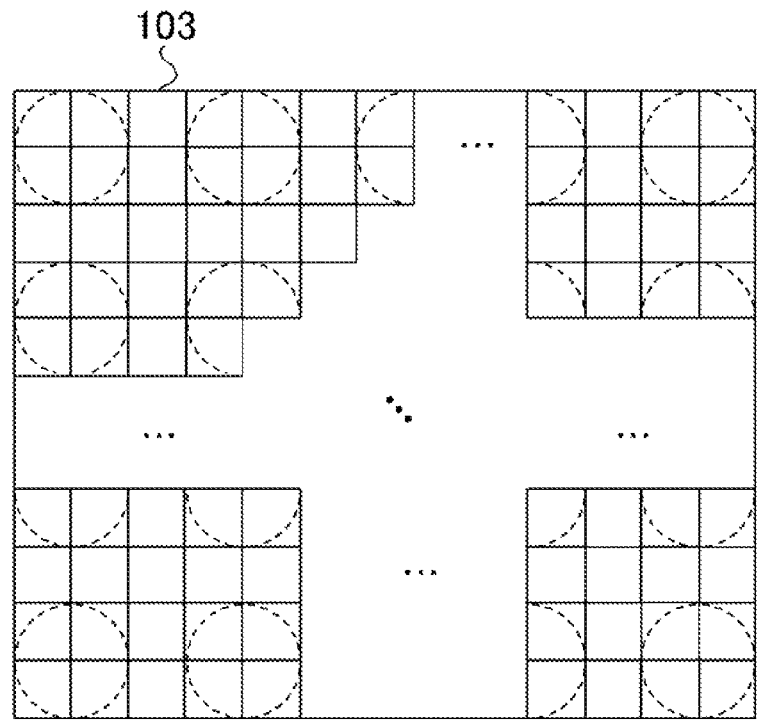
FIG. 10 is a diagram illustrating a relation of an image pickup element and a lens array in Embodiment 1.

FIG. 10 is a relational diagram between the image pickup element 103 of FIG. 9 and (the pitch of) the lens array 102. In FIG. 10, a rectangle represented by a solid line represents a pixel of the image pickup element 103. In addition, a distance between centers of two most adjacent circles (two adjacent circles) represents a pitch of the lens array 102. Here, a circle represented by a broken line represents a region which a light beam passing through one small lens enters. This region is represented by a circular shape in FIG. 10, but is changed according to a pupil shape of the imaging optical system 101. In the configuration of FIG. 9, the number of pupil divisions is two-dimensionally four, and thus the number of pixels corresponding to one small lens is four as illustrated in FIG. 10. In this case, when only the pixels at the same position with respect to the center of each circle are extracted, it is possible to obtain an image imaged from the same viewpoint. In addition, in FIG. 10, a region outside the circle drawn by a broken line is a region which a light beam does not enter, and is called a dead zone.

Figure 11:
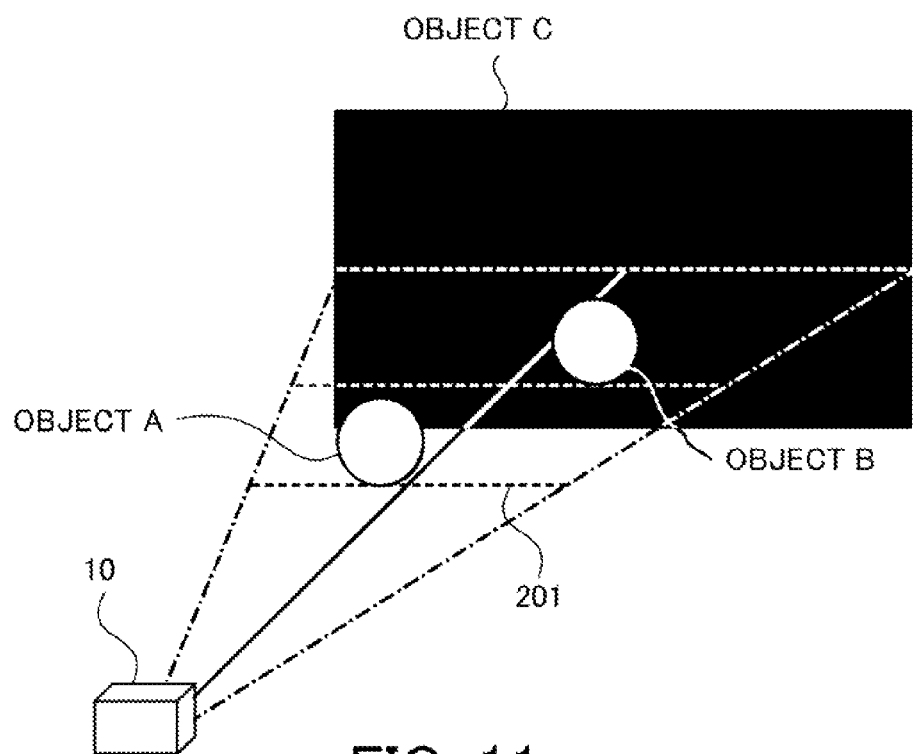
FIG. 11 is a diagram illustrating an example of an imaging scene in Embodiment 1.
Figure 12A:
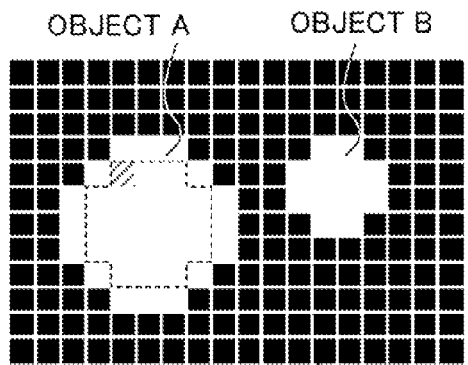
FIGS. 12A to 12D are diagrams illustrating examples of parallax images in Embodiment 1.
Figure 12B:
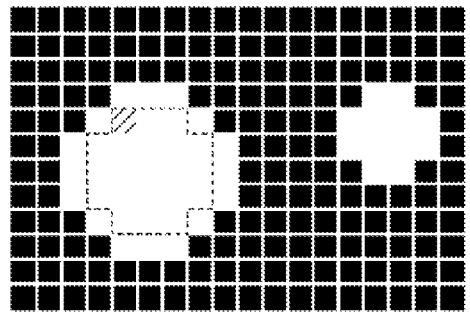
Figure 12C:
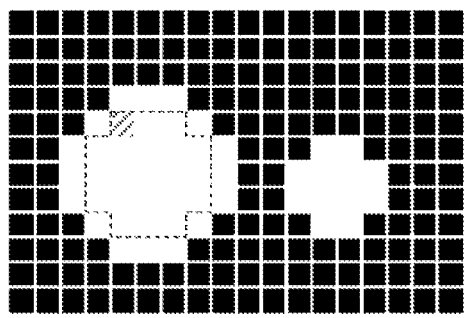
Figure 12D:
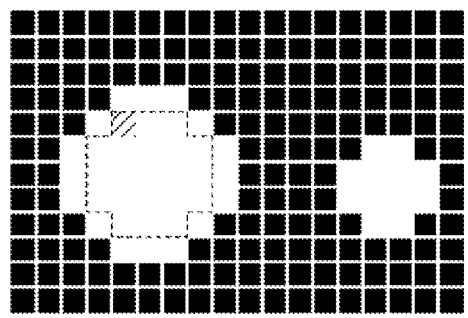

Here, in the configuration of FIG. 9, a case of imaging an object space illustrated in FIG. 11 is considered. FIG. 11 is a diagram illustrating an example of an imaging scene in the embodiment. In the object space illustrated in FIG. 11, an object A is positioned on the object plane 201, an object B is positioned far away therefrom, and an object C is positioned farther away. A chain line in FIG. 11 represents an angle of view of the image pickup apparatus 10 in a horizontal direction.

FIGS. 12A to 12D are diagrams illustrating an example of the parallax image in the embodiment, and illustrates an image obtained by extracting a pixel corresponding to each viewpoint from the image obtained from the image pickup element 103. FIGS. 12A to 12D are images as viewing the object space from each region of the pupil of the imaging optical system 101 divided into four. Here, the image of each viewpoint is configured by 18×12 pixels, but the number of pixels is not limited thereto. As known from FIG. 9, since an object point on the object plane 201 is imaged at the same position of the lens array 102 without depending on the viewpoint, the parallax does not occur. For this reason, the object A is imaged at the same position of FIGS. 12A to 12D. Meanwhile, parallax occurs for the object B present at another object distance. For this reason, as illustrated in FIGS. 12A to 12D, the object B is imaged at each shifted position.

Figure 13A:
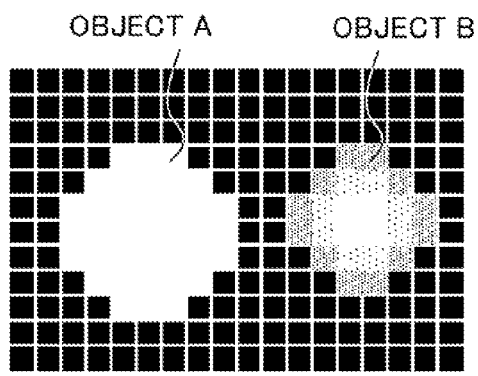
FIGS. 13A and 13B are diagrams illustrating examples of refocus images in Embodiment 1.
Figure 13B:
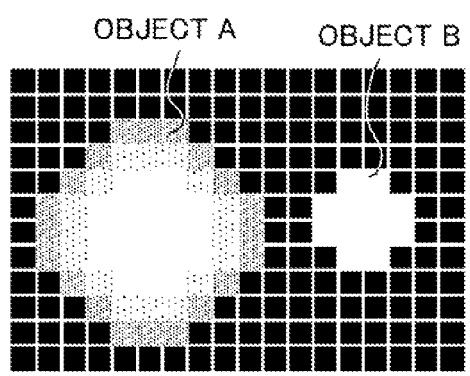

FIGS. 13A and 13B are diagrams illustrating an example of the refocus image in the embodiment. When the images of FIGS. 12A to 12D are combined to completely overlap the object A, the refocus image focused on the object plane 201 is generated as illustrated in FIG. 13A. In this case, the object positioned other than the object plane 201 is combined to be shifted, and thus is blurred similarly to the object B of FIG. 13A. The size of the blurring corresponds to the F number of the imaging optical system 101. A method of generating the refocus image illustrated in FIG. 13A corresponds to FIG. 7B.

The object A illustrated in FIG. 13A is obtained by combining four images. For this reason, when it is assumed that a noise component of the image follows Poisson distribution, the noise is reduced by ½ by averaging. In addition, the object B is blurred, that is, resolution is lowered, and thus the noise is reduced. The reducing of the resolution corresponds to sampling at a pitch larger than a pitch of a pixel of an image. For example, when the image of the pixel pitch $\Delta$ is sampled by a pitch $2\Delta$, the resolution is lowered, but the noise is reduced by ½. By the refocus of the object B or the like, the blurring region reduces the noise corresponding thereto. Accordingly, in the combined image of FIG. 13A, the noise is further reduced than the images illustrated in FIGS. 12A to 12D. The noise reducing effect is obtained similarly even in the refocused image in addition to the object plane 201. For example, when FIGS. 12A to 12D are combined to overlap the object B, it is possible to obtain the image illustrated in FIG. 13B. In this case, the noise of the object B is reduced by about ½ by averaging, the object A is blurred (the resolution is lowered), and the noise is reduced.

Next, the noise reducing process of the embodiment will be described. Here, it is assumed that a surface of an object present in the object space is a uniform diffusion surface. Each of the pixels of a region surrounded by the broken lines of FIGS. 12A to 12D images the same region of the object space. An edge portion of the object A is excluded because the edge portion is likely to be influenced by a background having parallax. However, when the edge portion is rarely influenced, the edge portion may be included in the region.

Here, since the object is the uniform diffusion surface, the signal value of each pixel has the same value when excluding the noise component. For example, four pixels with diagonal lines in FIGS. 12A to 12D image the same region of the object space, and thus has the same signal value when excluding the noise. For this reason, an average pixel value of four pixels is obtained, and the pixel value of the original diagonal line portion is substituted by the average pixel value. This is performed on all the pixels covered with the broken line, and thus the noise component of the region covered with the broken line of FIGS. 12A to 12D is reduced by about ½.

Here, the average pixel value may be a value obtained by averaging the pixel values by the same weight, and may be a value calculated by different weights. In the case of the latter, a method is conceivable in which the average pixel value is calculated first by the uniform weight, and the weight of the pixel close to the average pixel value in the original pixel values is increased. Next, the images of FIGS. 12A to 12D in which the noise of the broken line portion is reduced are combined to generate an output image. In this case, when the parallax image is combined to completely overlap the broken line portion, that is, is refocused on the object plane 201, it is the same as the conventional reconstruction as a result, and it is difficult to obtain the noise reducing effect more than that. However, when an image refocused other than the object plane 201 is generated, the pixel in which the noise is reduced by substitution by the average pixel value is combined with the pixel having the more different pixel value, and thus the noise is further reduced. Accordingly, for example, in the image refocused on the object B as illustrated in FIG. 13B, the noise in the vicinity of the blurred object A is reduced more than that of the case of using the conventional reconstruction method. In the conventional refocus processing, the noise of the region focused by the refocus is reduced by averaging of a plurality of pixels in which only the noise components are different. Then, in the region blurred by the refocus, the resolution of the region is lowered as compared with each parallax image, and the noise is reduced. However, in the noise reducing method of the embodiment, substitution by the average pixel value is performed in the region blurred by the refocus in addition to the conventional refocus processing. That is, in the region, the averaging of the pixels in which only the noises are different is performed in addition to the lowering of the resolution, and thus it is possible to further obtain the noise reducing effect.

Since the description hitherto is made in connection with a case in which the pixel substituted by the average pixel value is limited to the pixel imaging the object plane 201, for the simplification. However, the pixel may be pixels which image at different distances on the object space as long as the pixel images the same region of the object space. FIG. 9 is a diagram in which the pixels 1031 to 1034 are projected to the object space through the lens array 102 and the imaging optical system 101. From FIG. 9, it is understood that the pixel 1031 and the pixel 1034 image the same region at the object distance 204a. Similarly, the pixel 1032 and the pixel 1033 image the same region at the object distance 204b.

When the object present at such an object distance is imaged, the pixels imaging the object have the same signal value except for the noise. For this reason, by calculating and substituting the average pixel value, it is possible to obtain the noise reducing effect described above. In this case, when the pixels substituted by the same average pixel value are combined to completely overlap, it is difficult to obtain the improved noise reducing effect as described above. For this reason, the combining of the parallax images is performed such that the pixels substituted by the same average pixel value does not coincide, and thus it is possible to always improve the noise reducing effect as compared with the convention method.

More preferably, the shift amount of the combined pixels to each other is non-integral multiple of the pixel pitch. This corresponds to that the parallax images are combined to be shifted by a unit of sub-pixels to each other. Accordingly, in addition to the noise reducing effect, it is possible to achieve high resolution based on super-resolution by pixel shift.

In the case of FIG. 1, a pixel imaging constantly the same region is present on the object plane 201. Meanwhile, in the configuration of FIGS. 2 to 4, the pixel imaging the same region is not necessarily present. However, similarly, even in the configuration of FIGS. 2 to 4, it is possible to obtain the pixel imaging the same region and the object distance thereof by projecting the pixel to the object space.

In addition, it is not necessary that the pixel substituted by the average pixel value necessarily image completely the same region. Light intensity distribution of an object space is continuous except for an edge portion of the object. That is, when the regions imaged by the pixels substantially coincide with each other except for the edge portion, it can be considered that such pixel values are substantially the same except for noise. For example, when two pixels projected to the object space are overlapped with each other more than a half of the region of the projection pixel, the pixels may be considered as the pixels imaging substantially the same region. For this reason, when two pixels do not image the edge portion of the object, the average pixel value may be calculated and the pixel value may be substituted.

Figure 14:
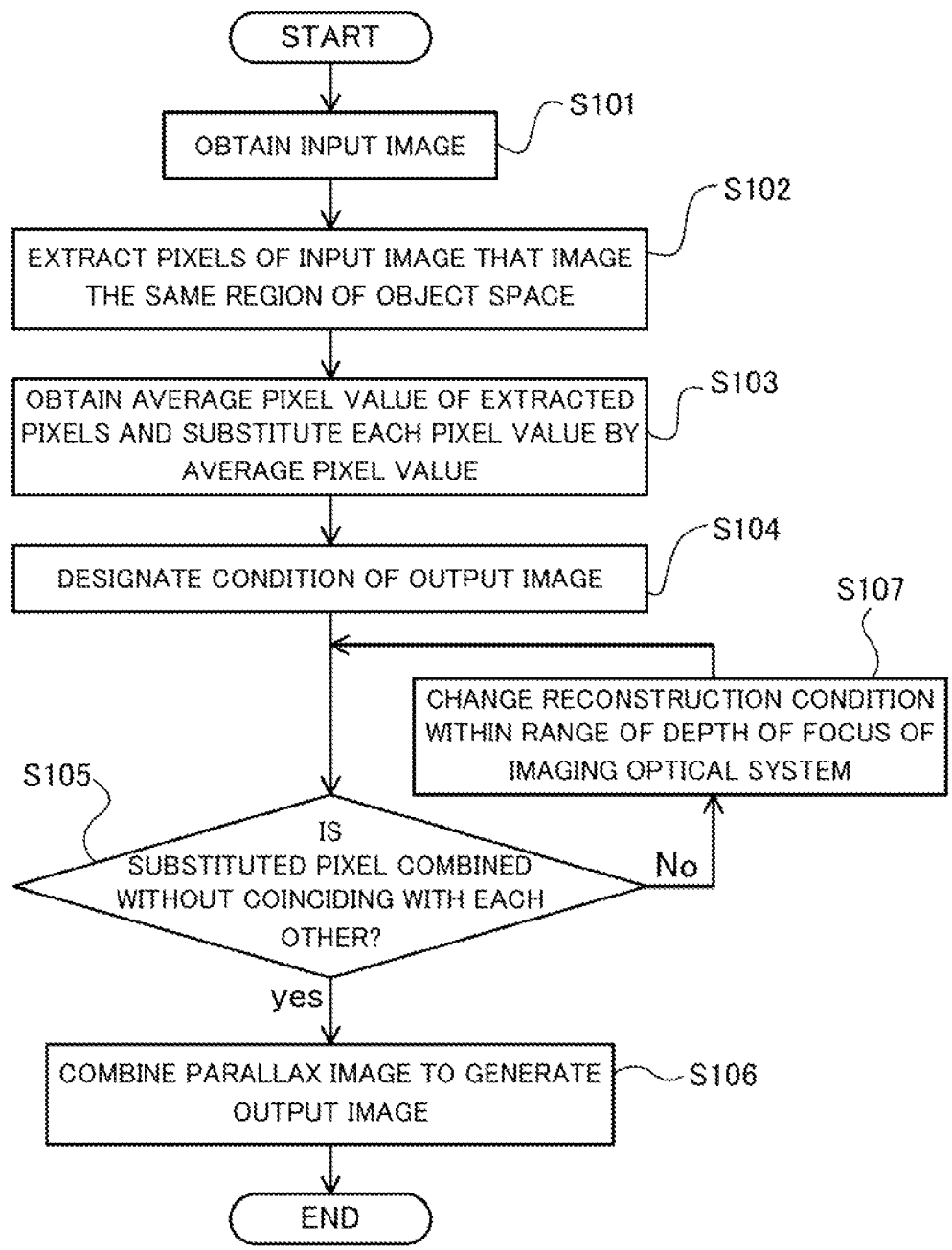
FIG. 14 is a flowchart of an image processing method in Embodiment 1.

Next, an image processing method of generating an output image from an input image will be described with reference to FIG. 14. FIG. 14 is a flowchart of the image processing method of generating the output image from the input image. In FIG. 14, Steps S102 and S103 correspond to the substitution process, and Step S106 corresponds to a combining process. In addition, the steps of FIG. 14 are performed by the image processing unit 105 based on an instruction of the system controller 111.

First, in Step S101, the image processing unit 105 obtains an input image obtained (imaged) through the image pickup optical system illustrated in FIG. 6. A method of reserving the light field included in the input image is changed according to the configuration of the image pickup optical system. However, in the embodiment, the pixel groups obtained by imaging the same region on the object plane 201 from a plurality of viewpoints are arranged in the image. In addition, the input image may be an image imaged by the same image pickup optical system stored in the image recording medium 110.

Subsequently, in Step S102, the image processing unit 105 extracts pixels imaging the same region of the object space from the input image. Such pixel extraction is performed, for example, using the following method. From the configuration of the image pickup apparatus recorded in the input image, as illustrated in FIG. 9, when the pixel is projected to the object space, it is possible to calculate an object distance in which different pixels are overlapped with each other and the overlapped pixels. In addition, it is possible to calculate a distance of the object space from parallax information of the input image. For this reason, by combining them, it is possible to obtain pixels to be extracted from the input image. In addition, there is a method of, first, generating an image of each viewpoint, obtaining a correspondence point of each image by using a block matching method or the like, and extracting the pixel by assuming that the same region is imaged when a difference of the pixel values of the corresponding pixels is equal to or less than a predetermined threshold value.

Then, in step S103, the image processing unit 105 calculates the average pixel value of the extracted pixel, and substitutes the pixel value of each extracted pixel by the average pixel value. Subsequently, in Step S104, the image processing unit 105 designates conditions of the output image. Here, the conditions of the output image are a focus position of the output image, a size of blurring, a viewpoint, a brightness, an image size, and the like, but are not limited thereto. In addition, among the plurality of conditions, the user designates only a predetermined condition, prescribed values of the other conditions are preset, and the prescribed values may be used.

Then, in Step S105, when the output image is generated under the designated condition, the image processing unit 105 determines whether the pixels (the pixel group) substituted by the same average pixel value are combined without coinciding with each other, that is, whether the substituted pixels are combined to be shifted from each other. When the substituted pixels do not coincide, that is, when the substituted pixels are combined to shift, it is possible to obtain the noise reducing effect by the substitution of the average pixel value, and thus process proceeds to Step S106. Meanwhile, when the substituted pixels coincide, the process proceeds to Step S107. As the determination method, for example, there is a method in which a condition that the pixels substituted by the same average pixel value coincide at the time of combining is calculated from information about the configuration of the image pickup optical system, and is compared with a designated condition. In addition, a condition for coinciding may be calculated in advance, and the condition may not be designated in Step S104. In this case, Steps S105 and S107 are unnecessary.

In Step S105, when the substituted pixels do not coincide, the image processing unit 105 combines the parallax images (the input images) to generate the output image in Step S106. At the time of combining the parallax images, as described above, the same operation (parallel movement or the like) is performed on the pixel of the input image corresponding to the pixel of the image pickup element 103 which the light beam passing through the same pupil region of the imaging optical system 101 enters. In this case, the pixels of the parallax images may be combined by different weights using the distance information of the object space. By setting appropriate weight to each pixel, aliasing is reduced, and it is possible to obtain a high-quality output image.

In Step S105, when the substituted pixels coincide, the image processing unit 105 changes the condition of the output image to obtain the noise reducing effect by the substitution of the average pixel value in Step S107. In this case, when the condition of the output image is drastically changed from the condition of the output image designated in Step S104, the output image is drastically separated from the designated condition. For this reason, when the focus position designated in Step S104 is the first focus position and the focus position of the generated output image is the second focus position, it is preferable that a difference between the first focus position and the second focus position is within the range of the depth of focus of the imaging optical system 101. That is, when the first focus position is designated, it is preferable that the image processing unit 105 generates the output image focused on the second focus position in which the difference from the first focus position is within the range of the depth of focus of the imaging optical system 101. Accordingly, the output image becomes close to the condition of the output image designated by the user.

The depth of focus of the imaging optical system 101 is represented approximately by $\pm F\epsilon$ when a diameter of a permissible confusion circle is $\epsilon$ and an F number of the imaging optical system 101 is F. Here, the diameter $\epsilon$ is a value determined according to performance necessary for the image pickup apparatus. As a method of determining the diameter $\epsilon$, there is a method of setting a difference between a width of a point image in the depth of focus and a width of a point image at the focus position to a range imperceptible for the user. For example, the diameter is given about five times the pixel pitch of the image pickup element 103. In addition, at the first focus position, when the pixels substituted by the same average pixel value do not coincide at the time of combining, the first focus position and the second focus position may not be the same as each other.

In addition, as necessary, another noise reducing process may be used together. For example, when a change amount of pixel values of adjacent pixels is small, a coring process of removing the small amount as noise, a bilateral filter, or a median filter may be used. Such a noise reducing process may be performed on the image of each viewpoint, or may be performed on the output image after combining.

As described above, the image processing unit 105 obtains the input image that is the information of the object space viewed from the plurality of viewpoints and that is obtained via the imaging optical system 101 and the image pickup element 103 having the plurality of pixels (Step S101). In addition, the image processing unit 105 calculates the average pixel value of the pixel group of the input image (the image pickup element 103) of the same region of the object space, and substitutes each pixel value of the pixel group by the average pixel value (Steps S102 and S103). The image processing unit 105 performs combining such that the pixels of the pixel group substituted by the average pixel value are shifted from each other to generate the output image (Step S106).

According to the embodiment, it is possible to provide the image processing apparatus, the image pickup apparatus, the image processing method, and the image processing program to effectively reduce the noise of the image obtained by combining the parallax images.

Embodiment 2

Figure 2:
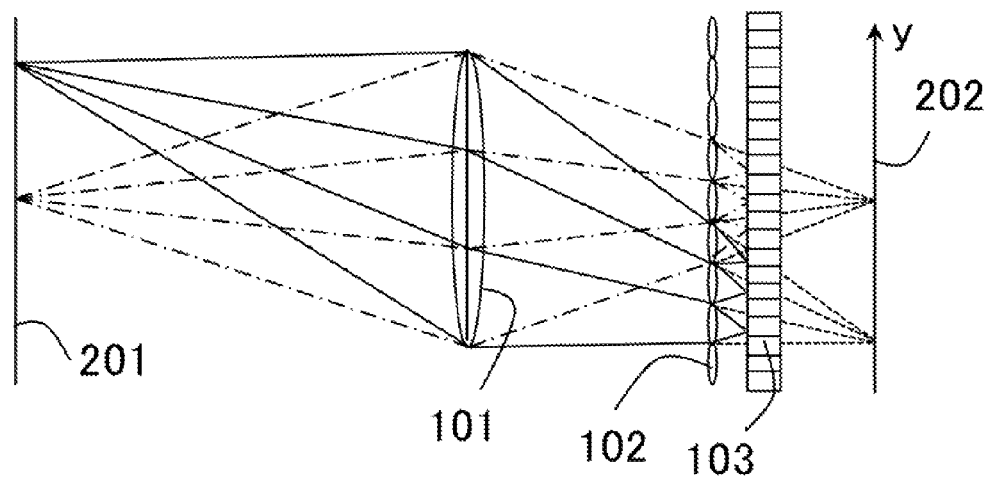
FIG. 2 is a schematic configuration diagram of an image pickup optical system in Embodiment 2.
Figure 15:
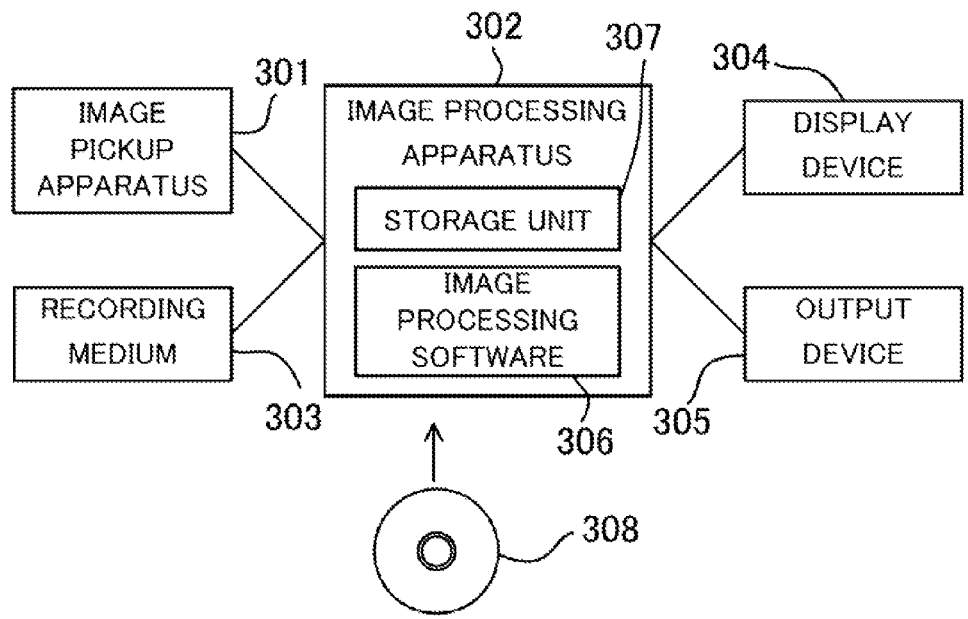
FIG. 15 is a block diagram of an image processing system in Embodiment 2.

Next, Embodiment 2 of the invention will be described. In the embodiment, an image processing apparatus (an image processing system) embodying the image processing method described above will be described. FIG. 15 is a block diagram of the image processing system of the embodiment. As illustrated in FIG. 15, the image processing system includes an image pickup apparatus 301. The image pickup apparatus 301 has an image pickup optical system having the configuration of FIG. 2. The lens array 102 of FIG. 2 is disposed such that the image-side conjugate plane 202 of the imaging optical system 101 with respect to the object plane 201 and the image pickup element 103 are conjugate to each other.

The image processing apparatus 302 is a computer apparatus (an information processing apparatus) performing the image reconstruction described above. The image processing apparatus 302 includes a storage unit 307 that stores image pickup condition information (information about a configuration of the image pickup optical system and distance information of an input image) of the input image obtained by the image pickup apparatus 301. The image pickup condition information stored in the storage unit 307 is used for generation (a substitution process and a combining process) of the output image. The image processing apparatus 302 performs a noise reducing process and a predetermined reconstruction process on the input image, and outputs the process result (the output image) to any one or a plurality of an output device 305, a display device 304, and a recording medium 303. As described above, the image processing apparatus 302 is an image processing unit that generates the output image from the input image using the image pickup condition information.

The recording medium 303 is, for example, a semiconductor memory, a hard disk, or a server on a network. The display device 304 is, for example, a liquid crystal display or a projector. The output device 305 is, for example, a printer. The display device 304 is connected to the image processing apparatus 302, and the reconstructed image is input to the display device 304. The user can perform work while confirming the image reconstructed through the display device 304. An image processing software 306 (an image processing program) performs the noise reducing process described above and the reconstruction process (the image processing method), and performs a development process or the other image process as necessary.

However, the embodiment is not limited thereto. For example, the image processing software 306 (the image processing program) having the function of the embodiment may be provided (installed) to the image processing apparatus 302 or the like through a network or various recording mediums 308 such as a CD-ROM. In this case, the image processing apparatus 302 reads the installed image processing program, and causes a computer (the information processing apparatus) such as a CPU or an MPU in the image processing apparatus 302 to perform the image process of the embodiment.

Figure 16:
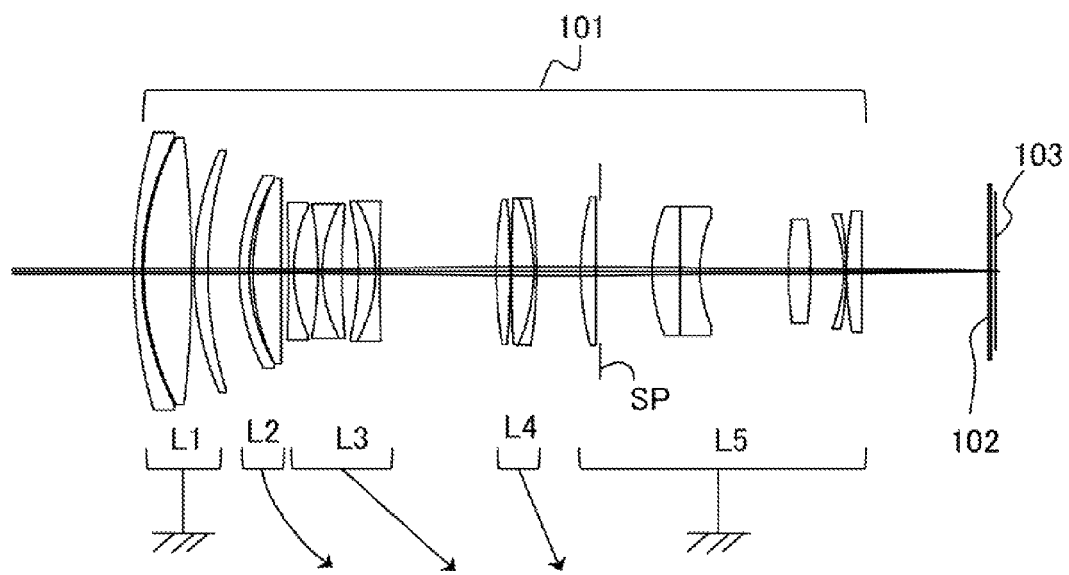
FIG. 16 is a cross-sectional view of an image pickup optical system in Embodiment 2.

FIG. 16 is a cross-sectional view of the image pickup optical system in the embodiment. In FIG. 16, the imaging optical system 101 is a zoom lens. In the small lens constituting the lens array 102, an object-side surface is flat and an image-side surface has a convex shape, and an image is formed on the image pickup element 103 by viewing an image formed by the imaging optical system 101 as an imaginary object. The imaging optical system 101 includes, in order from the object side, a first lens unit L1 having a positive refractive power, a second lens unit L2 having a positive refractive power, a third lens unit L3 having a negative refractive power, a fourth lens unit L4 having a positive refractive power, and a fifth lens unit L5 having a positive refractive power. At the timing of zooming, the first lens unit L1 and the fifth lens unit L5 are fixed, and the second lens unit L2, the third lens unit L3, and the fourth lens unit L4 are moved on an optical axis.

Figure 3:
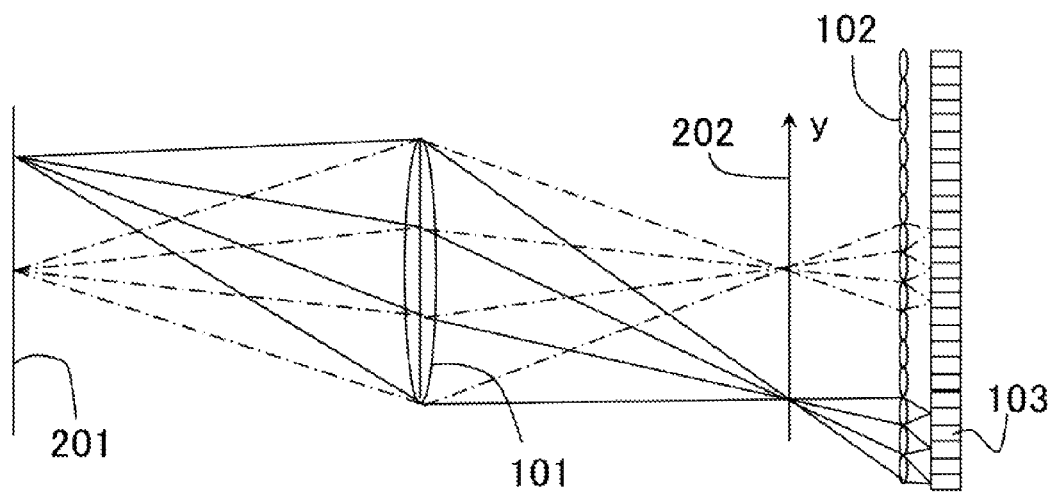
FIG. 3 is a schematic configuration diagram of an image pickup optical system in Embodiment 2.

The lens array 102 is disposed on the image-side conjugate plane of the imaging optical system 101 with respect to the object plane 201. In addition, the lens array 102 is configured such that the exit pupil of the imaging optical system 101 and the image pickup element 103 are substantially in the conjugate relation. Here, generally, the conjugate relation is meaning not only indicating a strict conjugate relation but also including a relation evaluated substantially as the conjugate relation (in short, the conjugate relation). The light beam from the object plane 201 enters a plurality of pixels of the image pickup element 103 different from each other according to the position and the angle on the object plane 201 of the light beam through the imaging optical system 101 and the lens array 102. By such a configuration, a light field is obtained. In the configurations of FIGS. 2 and 3, it is possible to obtain an image in which a plurality of small images with a different imaging viewpoint and imaging range by the image pickup element 103.

The configuration of the image pickup optical system of FIG. 3 is the same as the configuration of the image pickup optical system illustrated in FIG. 2 except that the lens array 102 is disposed further to image side than the image-side conjugate plane 202. A different from the configuration of FIG. 2 is that the lens array 102 reimages on the image pickup element 103 by viewing the formed image of the imaging optical system 101 as an actual object. However, all the configurations of the image pickup optical systems illustrated in FIGS. 2 and 3 are essentially the same since the lens array 102 views the image formed by the imaging optical system 101, as an object, and the image is imaged on the image pickup element 103. Accordingly, the following discussion is achieved similarly even with respect to the configuration of FIG. 3.

Figure 17A:
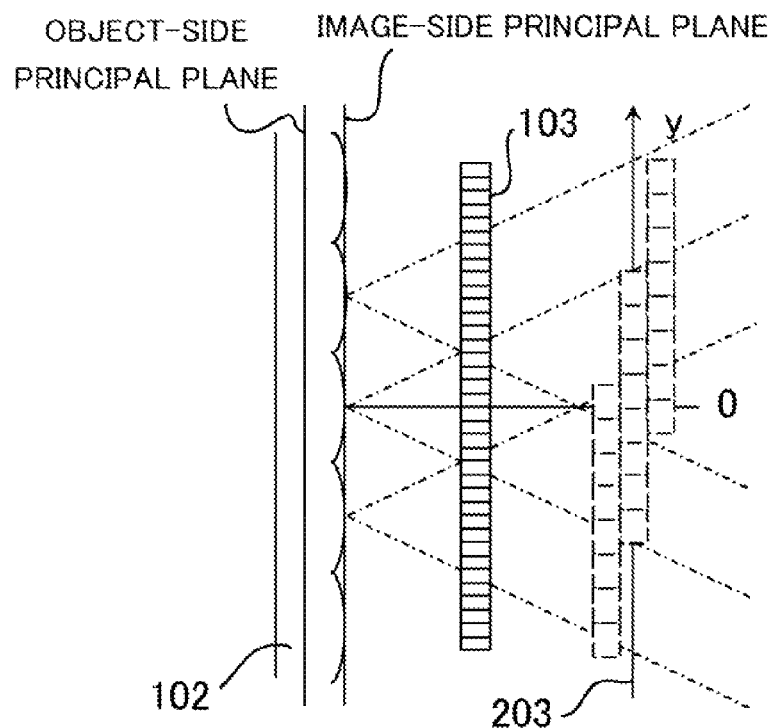
FIGS. 17A and 17B are diagrams illustrating refocus image generation in Embodiment 2.
Figure 17B:
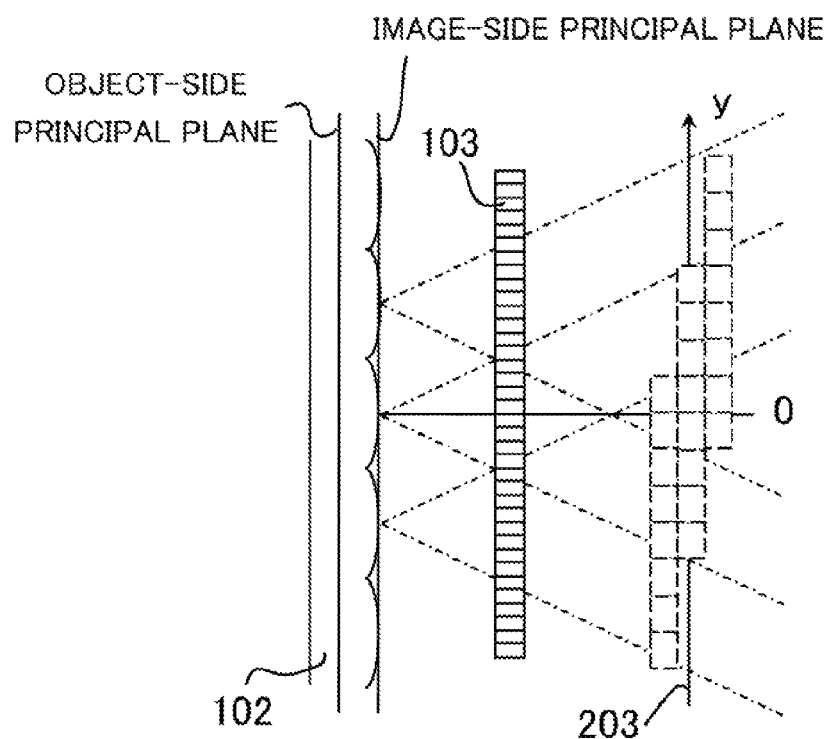

Next, a method of generating a refocus image in the embodiment will be described with reference to FIGS. 17A and 17B. FIGS. 17A and 17B are specific diagrams of a part of the lens array 102 and the image pickup element 103 in the configuration of the image pickup optical system illustrated in FIG. 2. In the embodiment, the lens array 102 is configured by a small lens in which an object-side surface is flat and an image-side surface has a convex shape. However, similarly to Embodiment 1, the shape of the lens array 102 is not limited thereto.

Chain lines in FIGS. 17A and 17B represent an angle of view of each small lens. The pixel values obtained by the image pickup element 103 are projected to a virtual imaging plane 203 and are combined through the small lens corresponding to the pixel, and thus it is possible to generate a refocus image focused on the virtual imaging plane 203. For example, in order to generate the image focused on the object plane 201 of FIG. 2, it is preferable to set the virtual imaging plane 203 to the image-side conjugate plane 202. In FIGS. 17A and 17B, the pixel projected at the time of generating the refocus image is represented by a broken line, and is illustrated to be shifted without overlapping to be easily understood. The generation of the refocus image may be a generating method of projecting the pixel described above, and a method of moving the pixels in parallel and combines the pixels to overlap the same pixel. In this case, when the regions of the lens array 102 through which the light beams entering the pixels pass are the same, the parallel movement amounts of such pixels are the same. As described above, the operation of the pixel at the time of generating the refocus image in the embodiment is determined according to the region of the lens array 102 through which the light beam entering the pixel passes.

Figure 18:
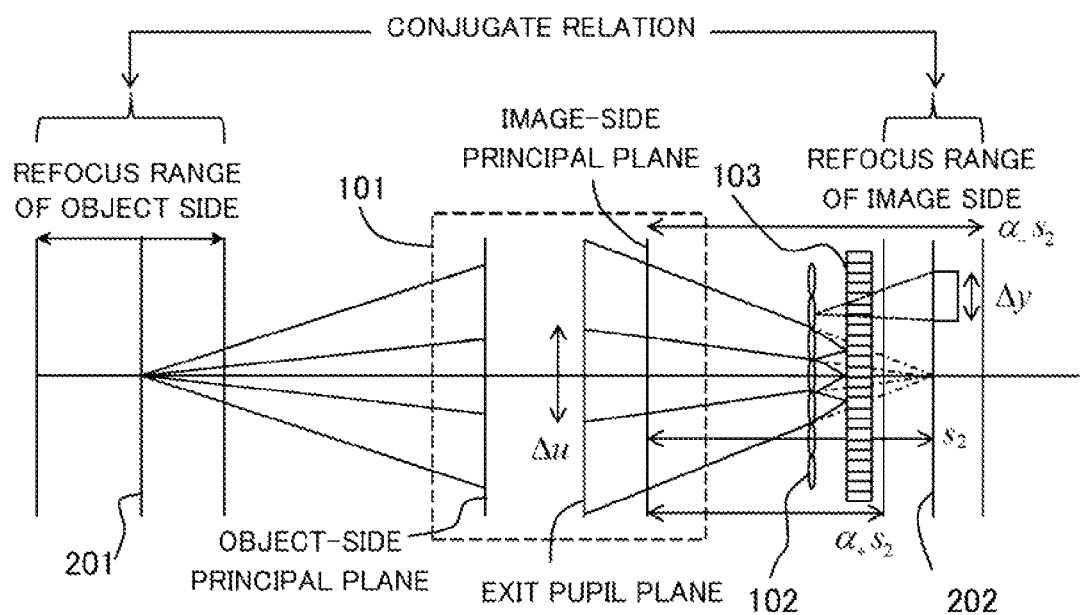
FIG. 18 is a diagram illustrating a refocus range in Embodiment 2.

Subsequently, a refocusable range will be described. The refocus range of the image pickup optical system in the embodiment is also represented by Expression (1) similarly to Embodiment 1. Relation thereof is as illustrated in FIG. 18. FIG. 18 is a diagram of a refocus range in the embodiment. In the image pickup optical system of the embodiment, $\Delta y = \Delta |\sigma_1/\sigma_2|$ is satisfied. This is to reduce and image the image formed by the imaging optical system 101 by $|\sigma_2/\sigma_1|$ times on the image pickup element 103 by viewing the image as an imaginary object by the lens array 102. Here, $\sigma_1$ is a distance (an interval) between the image-side conjugate plane 202 and the object-side principal plane of the lens array 102, and $\sigma_2$ is a distance (an interval) between the image-side principal plane of the lens array 102 and the image pickup element 103. $\sigma_1$ has a positive value when the image-side conjugate plane 202 is further to the object side than the object-side principal plane of the lens array 102, and has a negative value when it is further to the image side. In addition, for $\Delta u = P/(NF)$, Expression (1) may be rewritten as the following Expression (3) from $\Delta \ll P$.

$$\alpha_+ s_2 = s_2 \mp NF\Delta y = s_2 \mp NF\Delta |\sigma_1/\sigma_2| \quad (3)$$

Here, $\Delta$ is a pixel pitch of the image pickup element 103. When it is over the range of Expression (3) similarly to Embodiment 1, it is difficult to generate a correct refocus image.

Figure 24:
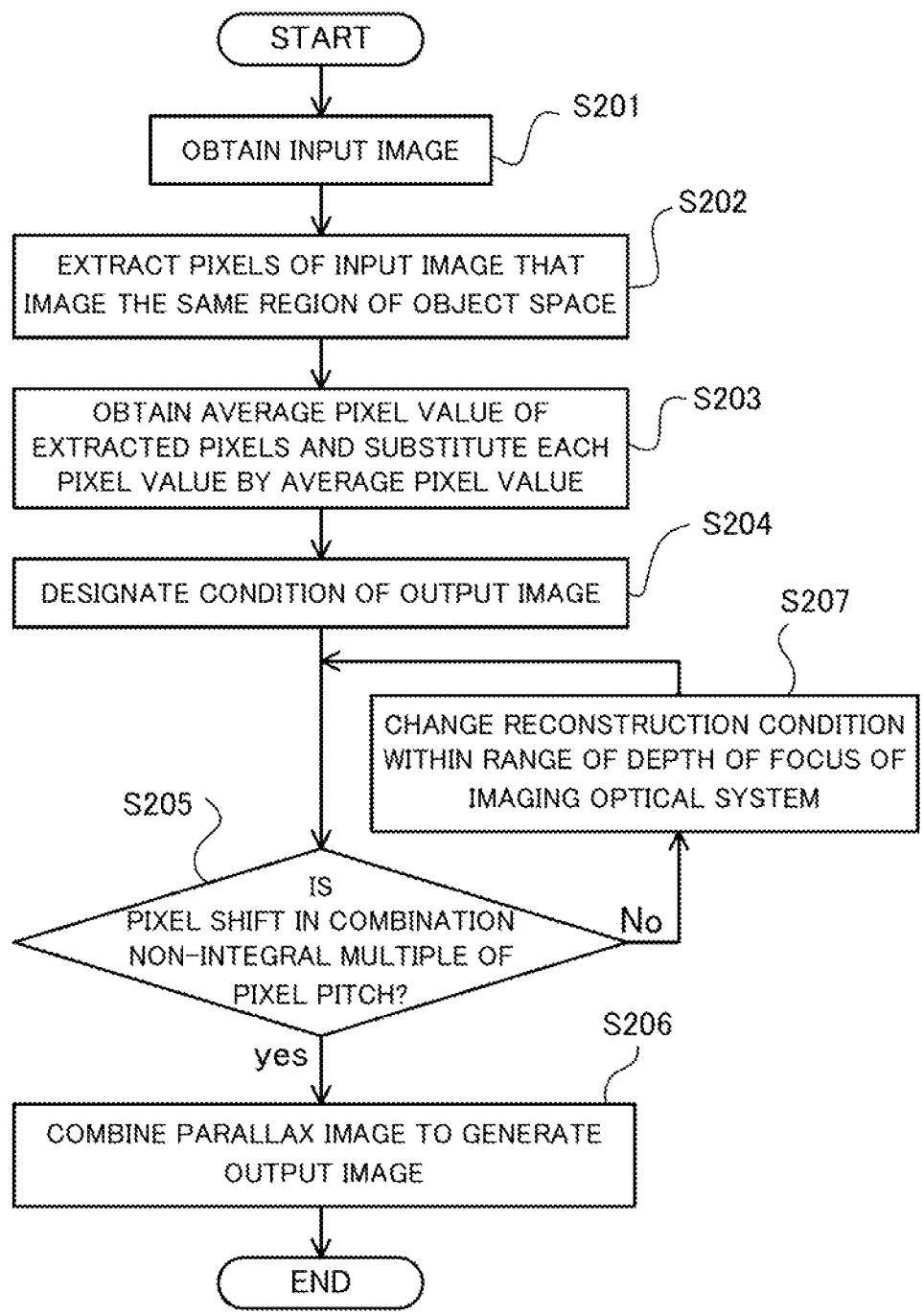
FIG. 24 is a flowchart of an image processing method in each of Embodiments 2 and 3.

Next, an image processing method of generating an output image from an input image in the embodiment will be described with reference to FIG. 24. FIG. 24 is a flowchart of the image processing method of generating the output image from the input image in the embodiment. Concerning FIG. 24, the description about the same portion as that of FIG. 14 is omitted. Each step of FIG. 24 is performed by the image processing apparatus 302.

First, in Step S201, the image processing apparatus 302 obtains an image in which a plurality of small images with different imaging viewpoints and imaging ranges are arranged, as the input image, from the image pickup apparatus 301 (the image pickup element 103). Subsequently, in Step S202, the image processing apparatus 302 extracts pixels imaging the same region of the object space from the input image. As the extracting method, in addition to the method described in Embodiment 1, a method of reading information of the pixels imaging the same region recorded in the image pickup apparatus 301 may be used. In addition, when the distance information of the object space is recorded in the image pickup apparatus 301, the distance information may be read and used. Subsequently, Steps S203 and S204 are the same as Steps S103 and S104 of FIG. 14, respectively.

Then, in Step S205, when the output image is generated under the designated condition, the image processing apparatus 302 determines whether the shift amount (the pixel shift) of the combined pixel is non-integral multiple of the pixel pitch. Here, the method of generating the output image is determined based on the configuration of the image pickup apparatus 301 recorded in the input image. When the image pickup apparatus 301 has the image pickup optical system illustrated in FIG. 1, the method of generating the refocus image described in Embodiment 1 is used. In the embodiment, the image pickup apparatus 301 has the image pickup optical system illustrated in FIG. 2. For this reason, the method of generating the refocus image illustrated in FIG. 17 or the like is used.

Here, as illustrated in FIG. 17A, when the pixel shift amount is non-integral multiple of the pitch of the projection pixel, the process proceeds to Step S206. Meanwhile, as illustrated in FIG. 17B, when the pixel shift amount is integral multiple of the pitch of the projection pixel, the process proceeds to Step S207. As the determination method, in addition to the method described in Embodiment 1, a method of reading the condition of overlapping the combined pixels recorded in the image pickup apparatus 301 and determining may be used.

In Step S205, when the pixel shift is non-integral multiple of the pixel pitch, the image processing apparatus 302 combines the parallax images to generate the output image in Step S206. At the time of combining the parallax images, as described above, the same operation is performed on the pixel of the input image corresponding to the pixel of the image pickup element 103 which the light beam passing through the same region of the lens array 102 enters.

As described above, the image processing apparatus 302 obtains the input image that is the information of the object space viewed from the plurality of viewpoints and that is obtained via the imaging optical system 101 and the image pickup element 103 having the plurality of pixels (Step S201). In addition, the image processing apparatus 302 calculates the average pixel value of the pixel group of the input image (the image pickup element 103) of the same region of the object space, and substitutes each pixel value of the pixel group by the average pixel value (Steps S202 and S203). The image processing apparatus 302 performs combining such that the shift amount of the pixel of the pixel group substituted by the average pixel value may be the non-integral multiple of the pixel to generate the output image (Step S206).

According to the embodiment, it is possible to provide the image processing apparatus, the image pickup apparatus, the image processing method, and the image processing program to effectively reduce the noise of the image obtained by combining the parallax images, and to have high resolution based on super-resolution by the pixel shift.

Embodiment 3

Figure 19:
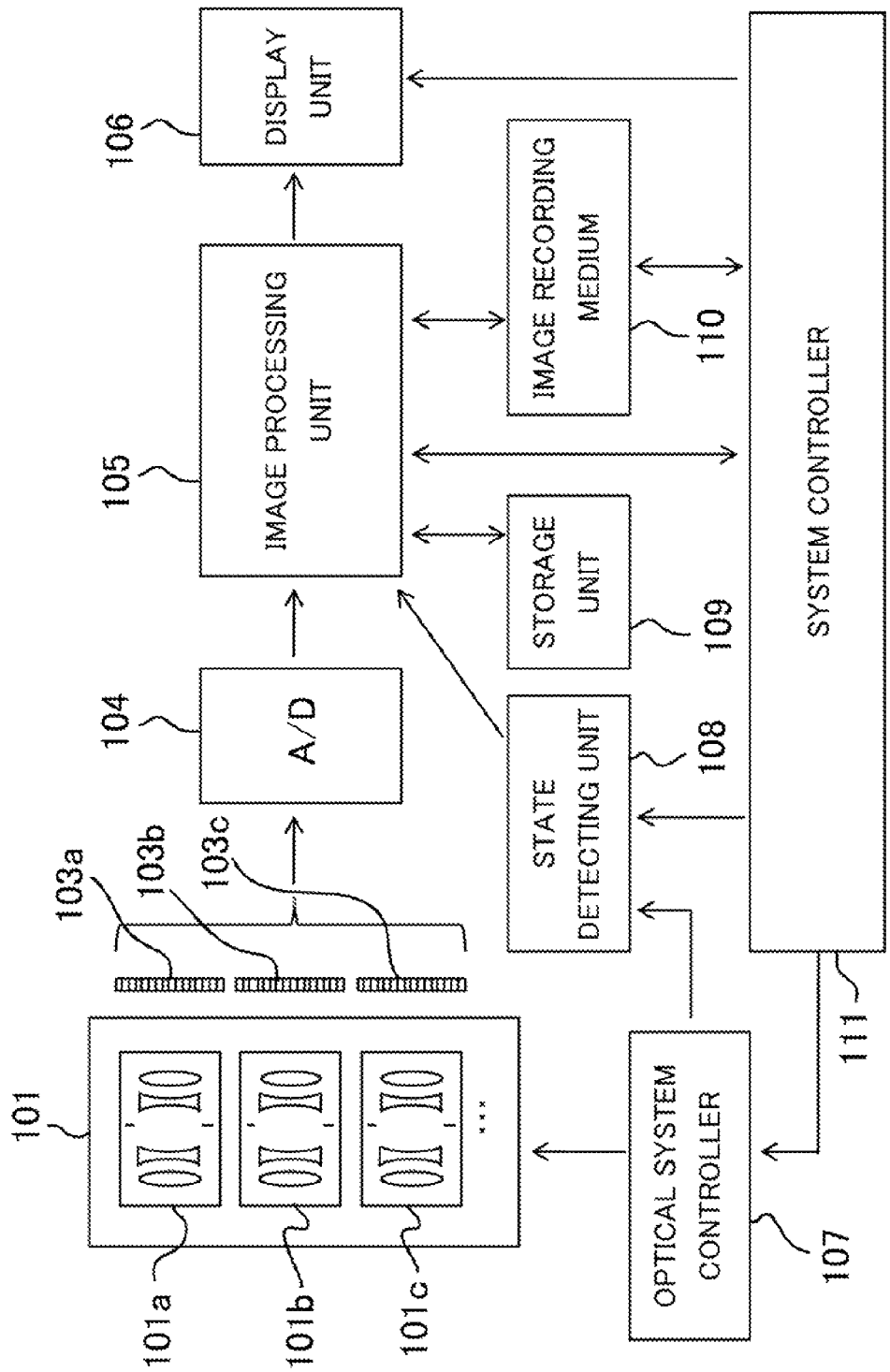
FIG. 19 is a block diagram of an image pickup apparatus in Embodiment 3.
Figure 20:
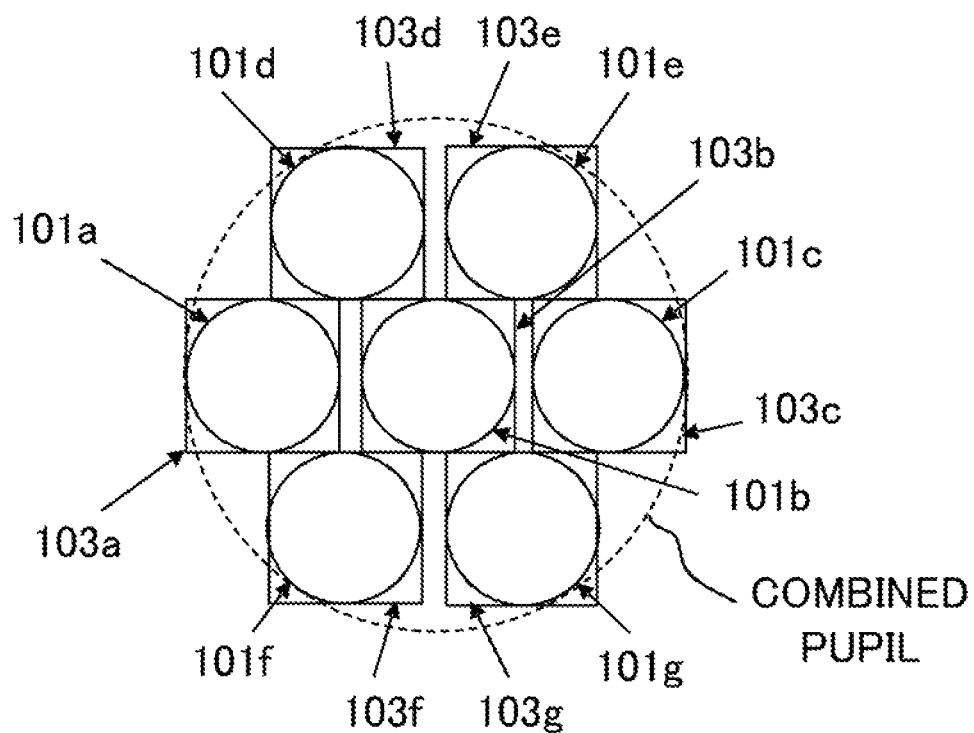
FIG. 20 is a schematic configuration diagram of an image pickup optical system in Embodiment 3.

Next, Embodiment 3 of the invention will be described. FIG. 19 is a block diagram of an image pickup apparatus of the embodiment. FIG. 20 is a schematic configuration diagram of an image pickup optical system in the embodiment, and is a diagram as viewing an imaging optical system 101 from an object side. In FIG. 19, a light beam from an object space (not illustrated) enters the imaging optical system 101. The imaging optical system 101 is configured to include a plurality of optical systems 101a to 101g having a positive refractive power as illustrated in FIG. 20. The imaging optical system 101 has a configuration with six-times symmetry when the optical axis of the optical system 101b is a rotation axis. However, the configuration of the imaging optical system 101 is not limited thereto, and the number or arrangement of optical systems may be appropriately modified. Image pickup elements 103a to 103g are arranged on image sides of the optical systems 101a to 101g, respectively. However, it is not essential to include the plurality of image pickup elements 103a to 103g in the embodiment, a singular image pickup element may be provided when it is possible to receive images formed by the optical systems 101a to 101g. For this reason, the image pickup apparatus of the embodiment may have at least one image pickup element.

Figure 4:
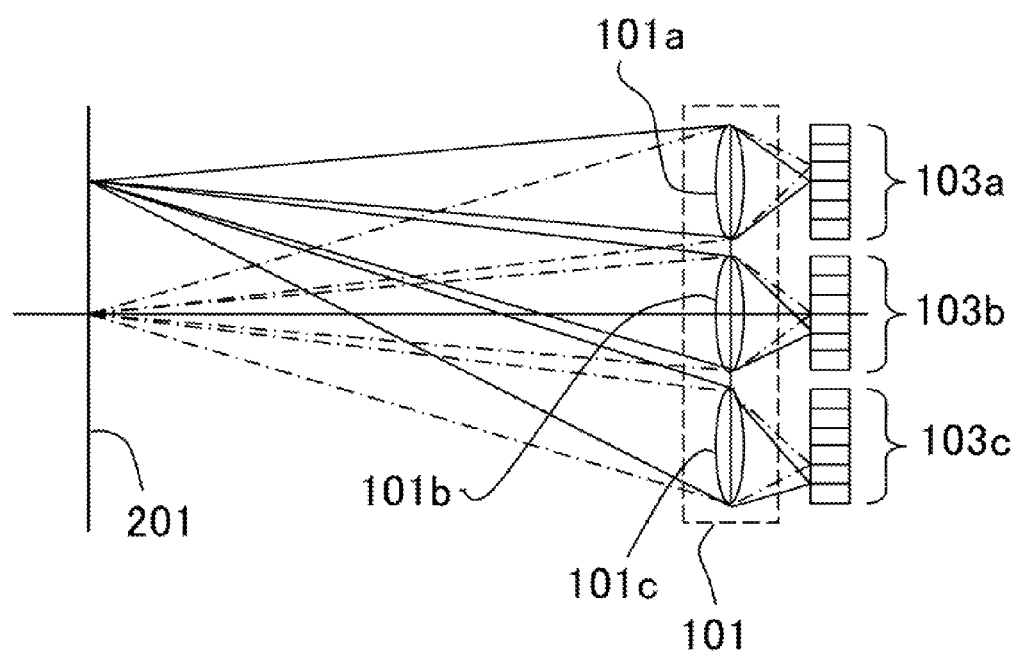
FIG. 4 is a schematic configuration diagram of an image pickup optical system in Embodiment 3.

FIG. 4 is a schematic diagram as viewing the image pickup optical system of the embodiment from a cross section including the optical axes of the optical systems 101a to 101c. The beams of light refracted by the optical system 101a to 101c are received by the corresponding image pickup elements 103a to 103c, respectively. The plurality of images obtained by the image pickup elements 103a to 103c are parallax images obtained by observing the object space from different viewpoints. By matching such a plurality of images, it is possible to obtain two-dimensional intensity distribution and angle information of light in the object space, that is, a light field. In the embodiment, such a plurality of parallax images become the input images.

Figure 21:
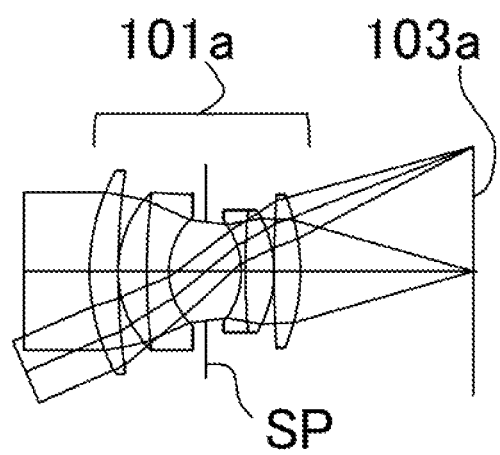
FIG. 21 is a cross-sectional view of an optical system in Embodiment 3.

FIG. 21 is a cross-sectional view of the optical system in the embodiment, and illustrates cross sections of the optical system 101a and the image pickup element 103a. Since the same is applied to the other optical systems 101b to 101g and the image pickup elements 103b to 103g, the description thereof is omitted. However, configurations of optical systems may be different from each other. The optical system 101a illustrated in FIG. 21 is a single-focus lens. As illustrated in FIG. 4, the light beam from the object plane 201 enters the other optical system constituting the imaging optical system 101 in accordance with the position and the angle of the light beam on the object plane 201, and is received by a different pixel of the image pickup element, and thus it is possible to obtain a light field.

Next, a method of generating a refocus image in the embodiment will be described. FIG. 22 is a diagram about refocus image generation, and is a specific diagram of the configuration of FIG. 4. The combined object-side principal plane of FIG. 22 is defined as a plane passing through each object-side principal point of the optical systems 101a to 101g. Similarly, the combined image-side principal plane is a plane passing through each image-side principal point of the optical systems 101a to 101g. In the configuration of the embodiment, the object-side principal plane and the image-side principal plane of the imaging optical system 101 are represented by the combined object-side principal plane and the combined image-side principal plane, respectively. A chain line of FIG. 22 represents an angle of view of each optical system.

When the focus position of the image side is matched with the virtual imaging plane 203, it is preferable that the pixel values obtained by the image pickup elements 103a to 103g are projected to the object-side refocus plane 204 through the optical systems 101a to 101g corresponding to the image pickup elements 103a to 103g and combined. The object-side refocus plane 204 is a plane conjugate to the virtual imaging plane 203 via the optical systems 101a to 101g. By moving the virtual imaging plane 203, it is possible to generate the refocus image focused on an arbitrary position.

For example, in order to generate the image focused on the object plane 201 of FIG. 4, it is preferable to set the virtual imaging plane 203 on the image pickup elements 103a to 103g. In this case, the object plane 201 and the object-side refocus plane 204 coincide. In FIG. 22, the pixel projected at the time of generating the refocus image is represented by a broken line, and is illustrated to be shifted without overlapping to be easily understood. The generation of the refocus image may be a generating method of projecting the pixel described above, and a method of moving the pixels in parallel and combines the pixels to overlap the same pixel. In this case, when the optical systems through which the beams of light input to the pixels pass are the same, the parallel movement amounts of such pixels are the same. As described above, the operation of the pixel at the time of generating the refocus image in the embodiment is determined in accordance with to the optical system through which the light beam entering the pixel passes.

Figure 23:
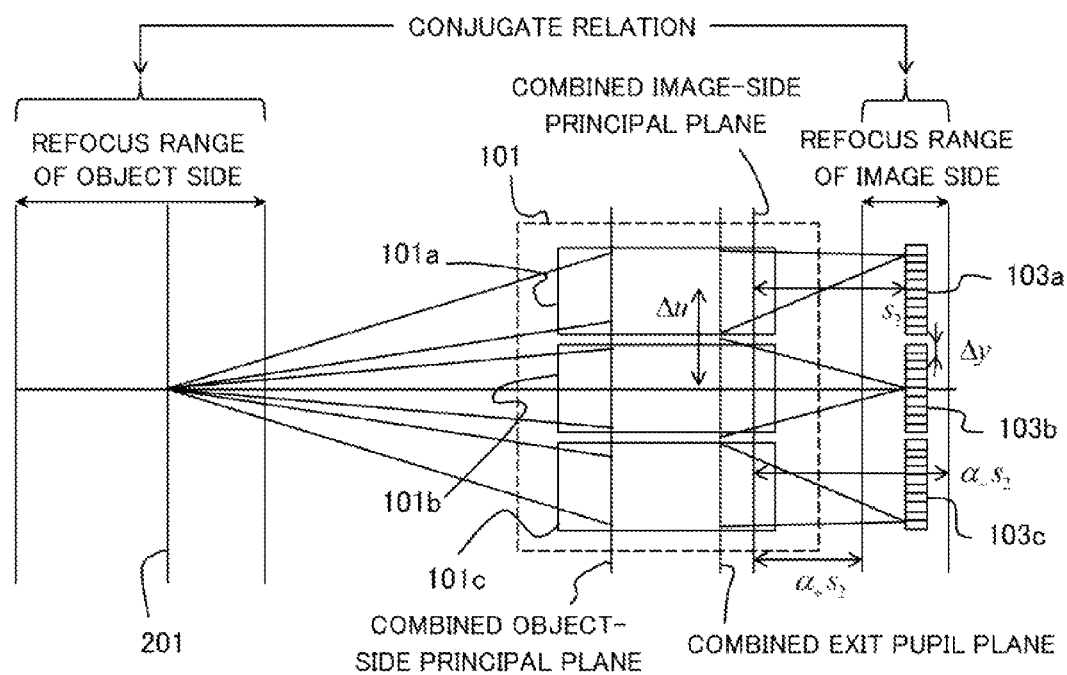
FIG. 23 is a diagram illustrating a refocus range in Embodiment 3.

Subsequently, a refocusable range will be described. The refocus range of the image pickup optical system in the embodiment is also represented by Expression (1) similarly to Embodiment 1, and relation thereof is as illustrated in FIG. 23. FIG. 23 is a diagram of a refocus range in the embodiment.

In the image pickup optical system of the embodiment, $\Delta y = \Delta$ and $\Delta u = P_{syn}/(NF_{syn})$ are satisfied, and Expression (1) may be approximated as the following Expression (4) from $\Delta \ll P_{syn}$.

$$\alpha_+ s_2 = s_2 \mp NF_{syn} \Delta y = s_2 \mp NF_{syn} \Delta \quad (4)$$

Here, $F_{syn}$ and $P_{syn}$ are an F number and an exit pupil distance calculated from a combined pupil of the imaging optical system 101 obtained by combining pupils of the optical systems 101a to 101g. A method of combining the pupils of the optical systems 101a to 101g may be a combination opening method or the like. The broken line of FIG. 20 and the combined exit pupil plane of FIG. 23 represent a concept of the combined pupil formed by the optical systems 101a to 101g. In the configuration of the embodiment, the pupil of the imaging optical system 101 is the combined pupil obtained by combining the plurality of optical systems 101a to 101g. Accordingly, the light beam from the same position on the object plane 201 passes through different pupil regions in the imaging optical system 101 according to an angle. Here, N is the number of divisions of the combined pupil in one-dimensional direction. In addition, when it is over the range of Expression (4) similarly to Embodiment 1, it is difficult to generate a correct refocus image. In addition, in the embodiment, the depth of focus of the imaging optical system 101 is calculated based on the combined pupil obtained by combining the pupils of the plurality of optical systems 101a to 101g.

The image processing method of generating the output image from the input image in the embodiment is performed by the image processing unit 105 according to the flowchart illustrated in FIG. 24. In addition, in the embodiment, the description about the same portion as that of Embodiment 2 is omitted.

First, in Step S201, the image processing unit 105 obtains a plurality of parallax images obtained by the image pickup elements 103a to 103g, as the input images. However, when the plurality of parallax information are obtained by a singular image pickup element, the input image is an image obtained by one image pickup element. The subsequent Steps S202 to S204 are the same as those of Embodiment 2.

Figure 22A:
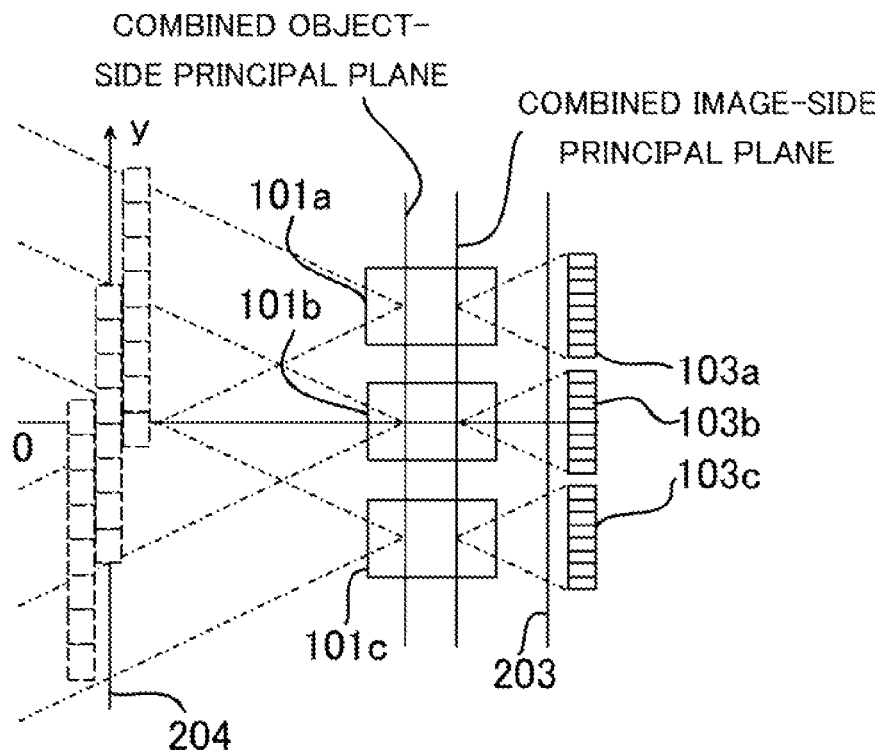
FIGS. 22A and 22B are diagrams illustrating refocus image generation in Embodiment 3.
Figure 22B:
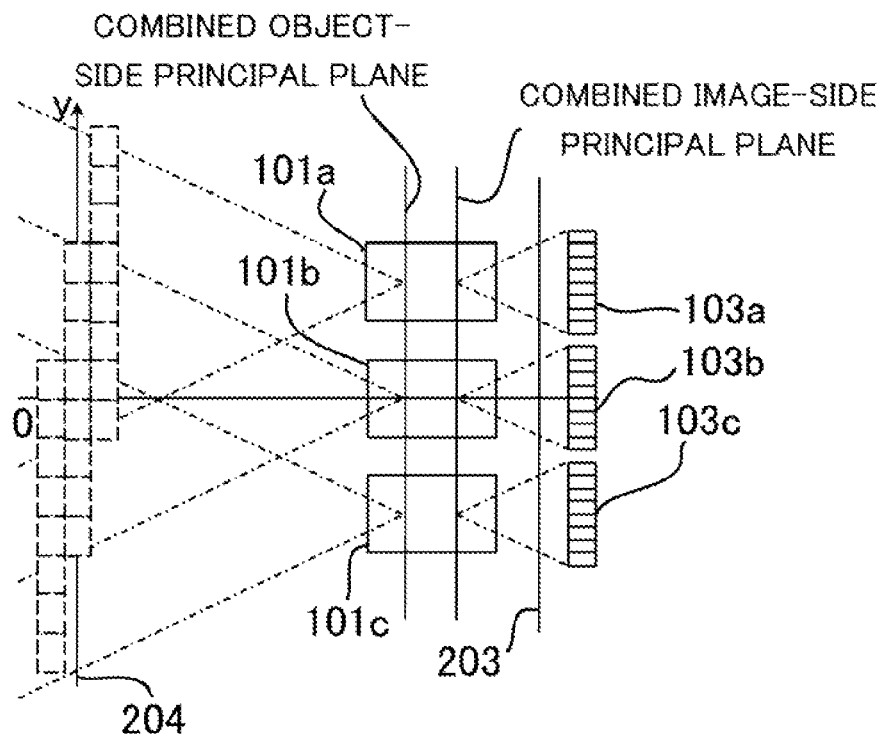

Then, in Step S205, when the output image is generated under the designated condition, the image processing unit 105 determines whether the shift amount (the pixel shift) of the combined pixel is non-integral multiple of the pixel pitch. As illustrated in FIG. 22A, when the pixel shift is non-integral multiple of the pitch of the projection pixel, the process proceeds to Step S206. Meanwhile, as illustrated in FIG. 22B, when the pixel shift is integral multiple of the pitch of the projection pixel, the process proceeds to Step S207.

In Step S205, when the pixel shift is non-integral multiple of the pixel pitch, the image processing unit 105 combines the parallax images to generate the output image in Step S206. At the time of combining the parallax images, the same operation is performed on the pixel of the input image corresponding to the pixel of the image pickup element 103 which the light beam passing through the same optical system enters.

According to the embodiment, it is possible to provide the image processing apparatus, the image pickup apparatus, the image processing method, and the image processing program to effectively reduce the noise of the image obtained by combining the parallax images, and to have high resolution based on super-resolution by the pixel shift.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-200117, filed on Sep. 12, 2012, which is hereby incorporated by reference herein in its entirety.

What is claimed is:

1. An image processing apparatus capable of generating a plurality of output images having different focus positions by processing an input image, the image processing apparatus comprising:
   a non-transitory memory configured to store image pickup condition information of the input image; and
   an image processor configured to generate the output image from the input image using the image pickup condition information,
   wherein the image processor is configured to:
   obtain the input image including information of an object space viewed from a plurality of viewpoints that is obtained via an imaging optical system and an image pickup element having a plurality of pixels including a group of distinct pixels that have imaged the same region of the object space during an image pickup;
   calculate an average of pixel values of the distinct pixels in the group of distinct pixels that have imaged the same region of the object space, the imaged same region of the object space corresponding in size to a size of each distinct pixel included in the group of distinct pixels, and substitute each of the pixel values of the distinct pixels in the group of distinct pixels with the calculated average of pixel values of the distinct pixels in the group of distinct pixels, the calculated average of pixel values being the average of pixel values of the distinct pixels in the group of distinct pixels obtained by the image pickup; and
   perform combination such that the distinct pixels in the group of distinct pixels having pixel values substituted with the calculated average of pixel values are shifted from each other to generate the output image.

2. The image processing apparatus according to claim 1, wherein the image processor performs combination such that a shift amount of the distinct pixels in the group of distinct pixels having pixel values substituted with the calculated average of pixel values is a non-integral multiple of a pixel pitch to generate the output image.

3. The image processing apparatus according to claim 1, wherein when a first focus position is designated, the image processor generates the output image focused on a second focus position where a difference from the first focus position is within a range of a depth of focus of the imaging optical system.

4. The image processing apparatus according to claim 1, wherein the non-transitory memory stores distance information of the input image as the image pickup condition information, and
   wherein the image processor substitutes each of the pixel values of the distinct pixels in the group of distinct pixels with the calculated average of pixel values of the distinct pixels in the group of distinct pixels using the distance information.

5. An image pickup apparatus capable of generating a plurality of output images having different focus positions by processing an input image, the image pickup apparatus comprising:
   an imaging optical system;
   an image pickup element including a plurality of pixels;
   a lens array configured to cause a light beam from the same position of an object plane to enter pixels of the image pickup element different from each other in accordance with a pupil region of the imaging optical system through which the light beam passes; and
   an image processor configured to generate the output image from the input image obtained by the image pickup element,
   wherein the image processor is configured to:
   obtain the input image including information of an object space viewed from a plurality of viewpoints that is obtained via the imaging optical system, the image pickup element, and the lens array, the plurality of pixels of the image pickup element including a group of distinct pixels that have imaged the same region of the object space during an image pickup;
   calculate an average of pixel values of the distinct pixels in the group of distinct pixels that have imaged the same region of the object space, the imaged same region of the object space corresponding in size to a size of each distinct pixel included in the group of distinct pixels, and substitute each of the pixel values of the distinct pixels in the group of distinct pixels with the calculated average of pixel values of the distinct pixels in the group of distinct pixels, the calculated average of pixel values being the average of pixel values of the distinct pixels in the group of distinct pixels obtained by the image pickup; and
   perform combination such that the distinct pixels in the group of distinct pixels having pixel values substituted with the calculated average of pixel values are shifted from each other to generate the output image.

6. The image pickup apparatus according to claim 5, wherein the lens array is disposed on an image-side conjugate plane of the imaging optical system with respect to the object plane.

7. The image pickup apparatus according to claim 5, wherein the lens array is disposed such that an image-side conjugate plane of the imaging optical system with respect to the object plane and the image pickup element are conjugate to each other.

8. An image pickup apparatus capable of generating a plurality of output images having different focus positions by processing an input image, the image pickup apparatus comprising:
   an imaging optical system including a plurality of optical systems having a positive refractive power;
   at least one image pickup element including a plurality of pixels; and
   an image processor configured to generate the output image from the input image obtained by the image pickup element, wherein when a pupil of the imaging optical system is a pupil formed by combining pupils of the plurality of optical systems, the plurality of optical systems are arranged such that a light beam from the same position of an object plane enters pixels of the image pickup element different from each other in accordance with the a pupil region of the imaging optical system through which the light beam passes, wherein the image processor is configured to:

obtain the input image including information of an object space viewed from a plurality of viewpoints that is obtained via the imaging optical system and the image pickup element, the plurality of pixels of the at least one image pickup element including a group of distinct pixels that have imaged the same region of the object space during an image pickup;

calculate an average of pixel values of the distinct pixels in the group of distinct pixels that have imaged the same region of the object space, the imaged same region of the object space corresponding in size to a size of each distinct pixel included in the group of distinct pixels, and substitute each of the pixel values of the distinct pixels in the group of distinct pixels with the calculated average of pixel values of the distinct pixels in the group of distinct pixels, the calculated average of pixel values being the average of pixel values of the distinct pixels in the group of distinct pixels obtained by the image pickup; and perform combination such that the distinct pixels in the group of distinct pixels having pixel values substituted with the calculated average of pixel values are shifted from each other to generate the output image.

9. An image processing method capable of generating a plurality of output images having different focus positions by processing an input image, the method comprising the steps of:

obtaining the input image including information of an object space viewed from a plurality of viewpoints that is obtained via an imaging optical system and an image pickup element having a plurality of pixels including a group of distinct pixels that have imaged the same region of the object space during an image pickup;

calculating an average of pixel values of the distinct pixels in the group of distinct pixels that have imaged the same region of the object space, the imaged same region of the object space corresponding in size to a size of each distinct pixel included in the group of distinct pixels, and substituting each of the pixel values of the distinct pixels in the group of distinct pixels with the calculated average of pixel values of the distinct pixels in the group of distinct pixels, the calculated average of pixel values being the average of pixel values of the distinct pixels in the group of distinct pixels obtained by the image pickup; and performing combination such that the distinct pixels in the group of distinct pixels having pixel values substituted with the calculated average of pixel values are shifted from each other to generate the output image.

10. A non-transitory computer-readable storage medium which stores an image processing program capable of generating a plurality of output images having different focus positions by processing an input image, the image processing program being configured to cause an information processing apparatus to execute the steps of:

obtaining the input image including information of an object space viewed from a plurality of viewpoints that is obtained via an imaging optical system and an image pickup element having a plurality of pixels including a group of distinct pixels that have imaged the same region of the object space during an image pickup;

calculating an average of pixel values of the distinct pixels in the group of distinct pixels that have imaged the same region of the object space, the imaged same region of the object space corresponding in size to a size of each distinct pixel included in the group of distinct pixels, and substituting each of the pixel values of the distinct pixels in the group of distinct pixels with the calculated average of pixel values of the distinct pixels in the group of distinct pixels, the calculated average of pixel values being the average of pixel values of the distinct pixels in the group of distinct pixels obtained by the image pickup; and performing combination such that the distinct pixels in the group of distinct pixels having pixel values substituted with the calculated average of pixel values are shifted from each other to generate the output image.

* * * * *